United States Patent
Virodov

(10) Patent No.: US 10,552,984 B2
(45) Date of Patent: Feb. 4, 2020

(54) CAPTURE DEVICE CALIBRATION METHODS AND SYSTEMS

(71) Applicant: Verizon Patent and Licensing Inc., Arlington, VA (US)

(72) Inventor: Sergey Virodov, Warren, NJ (US)

(73) Assignee: Verizon Patent and Licensing I nc., Basking Ridge, NJ (US)

( * ) Notice: Subject to any disclaimer, the term of this patent is extended or adjusted under 35 U.S.C. 154(b) by 44 days.

(21) Appl. No.: 15/728,396

(22) Filed: Oct. 9, 2017

(65) Prior Publication Data

US 2019/0108653 A1 Apr. 11, 2019

(51) Int. Cl.
  *G06T 7/80* (2017.01)
  *G06T 7/73* (2017.01)

(52) U.S. Cl.
  CPC ............... *G06T 7/85* (2017.01); *G06T 7/74* (2017.01); *G06T 2207/10028* (2013.01)

(58) Field of Classification Search
  CPC .... G06T 7/85; G06T 7/74; G06T 2207/10028
  See application file for complete search history.

(56) References Cited

U.S. PATENT DOCUMENTS

| | | | |
|---|---|---|---|
| 8,619,144 B1 * | 12/2013 | Chang | G06T 7/80 348/187 |
| 2013/0070048 A1 * | 3/2013 | Huang | G01B 11/16 348/36 |
| 2013/0135474 A1 * | 5/2013 | Sakano | G06K 9/00791 348/148 |

* cited by examiner

*Primary Examiner* — John W Lee

(57) ABSTRACT

A capture device calibration system accesses a plurality of datasets that are synchronously captured by a set of capture devices. The capture devices are progressively relocated to form a plurality of different positional configurations each implementing a formation that includes a center position and one or more peripheral positions. The capture device calibration system determines three dimensional ("3D") locations of features of a calibration object positioned in front of the formation based on different representations of the calibration object captured by the set of capture devices from different view angles associated with the center position and the one or more peripheral positions included within the formation. Based on the determined 3D locations of the features of the calibration object, the capture device calibration system determines a set of intrinsic parameter values for one or more of the capture devices in the set of capture devices. Corresponding methods are also disclosed.

20 Claims, 16 Drawing Sheets

CAPTURE DEVICE CALIBRATION METHODS AND SYSTEMS

BACKGROUND INFORMATION

Volumetric alignment is a computer graphics technique in which image data depicting objects included in a capture zone is captured from different perspectives around the objects to generate multiple volumetric datasets (e.g., datasets that include color and depth data from each of the different perspectives). The volumetric datasets are volumetrically aligned by being transformed (e.g., rotated, translated, etc.) from multiple local coordinate systems to a single global coordinate system. In the global coordinate system, data from each of the multiple volumetric datasets may align so as to form a three-dimensional ("3D") reconstruction of the objects depicted in the image data. Volumetric alignment may be useful in various types of applications including, for example, in generating virtual reality content representative of objects photographically or videographically captured from a capture zone of a real-world scene. For example, virtual reality content representative of a real-world scene and generated using volumetric alignment may be experienced (e.g., seen, explored, interacted with, etc.) by virtual reality users who desire to experience the real-world scene vicariously.

Models for performing volumetric alignment and/or other computer graphic techniques commonly operate on an assumption that image data being processed has been captured by capture devices (e.g., video cameras, depth capture devices, etc.) having particular ideal properties. For example, models may operate on an assumption that data has been captured by ideal capture devices having no lens distortion rather than by real capture devices that have at least some degree of lens distortion. Accordingly, to perform volumetric alignment, intrinsic and/or extrinsic parameter values of capture devices may be derived that, when applied to data captured by real capture devices, may compensate for (e.g., remove) lens distortion and/or other non-ideal characteristics specific to each capture device and may facilitate proper transformation of the data to a single global coordinate system along with data captured by other capture devices.

BRIEF DESCRIPTION OF THE DRAWINGS

The accompanying drawings illustrate various embodiments and are a part of the specification. The illustrated embodiments are merely examples and do not limit the scope of the disclosure. Throughout the drawings, identical or similar reference numbers designate identical or similar elements.

DETAILED DESCRIPTION OF PREFERRED EMBODIMENTS

Figure 1:
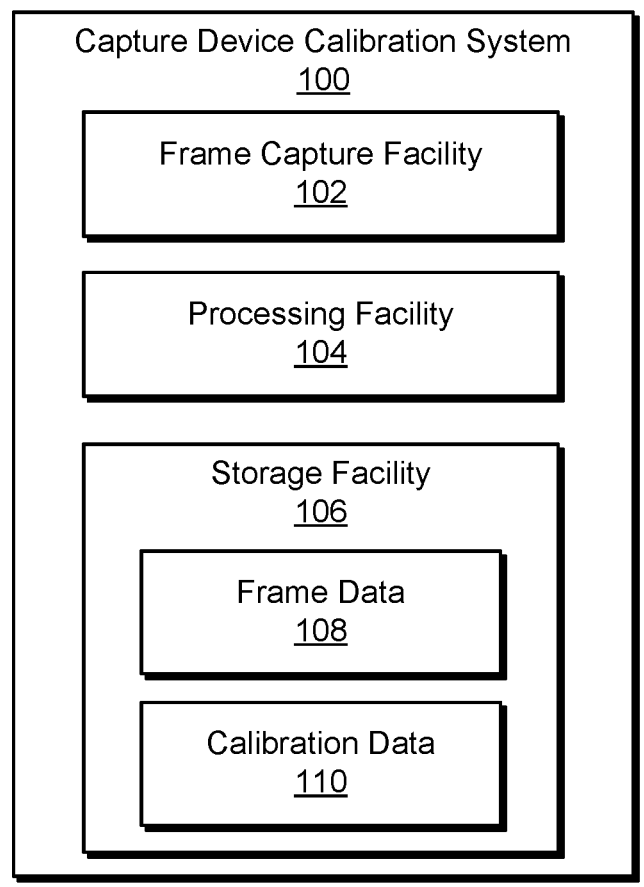
FIG. 1 illustrates an exemplary capture device calibration system according to principles described herein.

Capture device calibration methods and systems are described herein. For example, systems and methods for calibrating capture devices (e.g., video camera devices, depth capture devices, combinations thereof, etc.) may involve determining respective sets of intrinsic and/or extrinsic parameter values for the capture devices. As will be described below, capture devices (e.g., calibrated capture devices for which intrinsic and/or extrinsic parameter values have been determined) may be used to allow and/or facilitate volumetric alignment of image data captured by the capture devices from different perspectives. For example, intrinsic parameter values of a particular capture device may be applied to image data captured by the capture device at any suitable time or in any suitable way to compensate for lens distortion and/or other non-ideal characteristics of the capture device in the captured image data. For instance, intrinsic parameter values of the particular capture device may be applied to image data as the image data is being captured such that the image data provided by the capture device appears to be captured by an ideal capture device (e.g., a capture device that implements an ideal model for image capture such as a pinhole camera model or the like) rather than a real capture device. In other examples, the capture device may provide the image data as captured (i.e., without yet compensating for non-ideal characteristics) and the intrinsic parameter values may be applied to the data as part of the processing of the image data (e.g., as part of or as preprocessing for the volumetric alignment). Volumetric alignment of image data conforming to ideal mathematical models (i.e., image data to which intrinsic parameter values have been applied) may then be performed using extrinsic parameter values, as will be described in more detail below.

In order to determine a set of intrinsic parameter values for a particular capture device in a set of capture devices, one implementation of a capture device calibration system may access a plurality of datasets captured by the set of capture devices as the set of capture devices are arranged in different positional configurations (also referred to herein as "calibration configurations") each implementing a formation that includes a center position and one or more peripheral positions around the center position.

The capture devices in the set of capture devices may be progressively relocated (e.g., moved) to form the different positional configurations. For example, the set of capture devices may be progressively relocated, moved, or rotated about a central location, such that each capture device has a turn in the center position of the formation and has a turn at each of the one or more peripheral positions. As such, each dataset in the plurality of datasets accessed by the capture device calibration system may include a respective plurality of synchronized sets of frames captured by the set of capture devices while the set of capture devices is set up in a respective positional configuration within the plurality of different positional configurations. For instance, one dataset may include a plurality of synchronized sets of frames captured while the set of capture devices is set up in a first positional configuration in which the particular capture device is set up at the center position. Similarly, other datasets may include respective pluralities of synchronized sets of frames captured while the set of capture devices is set up in one or more other positional configurations in which the particular capture device is set up at the one or more peripheral positions around the center position.

Based on the data within the plurality of datasets captured by the set of capture devices, the capture device calibration system may determine three dimensional ("3D") locations of features of a calibration object positioned in front of the formation. For example, the calibration object may be implemented so as to include a calibration pattern, such as a checkerboard pattern with distinct corners (e.g., corners that may be readily recognizable by image processing techniques) where dark and light colored squares meet or another suitable pattern with similarly distinct features. To optimize the accuracy with which 3D locations are determined, the capture device calibration system may determine each 3D location based on different representations of the calibration object from different view angles associated with the center position and the one or more peripheral positions within the formation. For example, each synchronized set of frames in a given plurality of synchronized sets of frames included in a dataset may include frames that are captured synchronously (e.g., at approximately the same time) but that depict different representations of the features of the calibration object from different view angles (e.g., perspectives).

Additionally, the different representations of the calibration object (e.g., the different depictions from the different perspectives included on the different frames) used by the capture device calibration system to determine the 3D locations may be depicted by frames included in different synchronized sets of frames captured while the set of capture devices is set up in different positional configurations. For example, the different representations may be depicted by frames included in a first synchronized set of frames captured while the set of capture devices is set up in the first positional configuration and may be further depicted by frames included in one or more other synchronized sets of frames captured while the set of capture devices is set up in the one or more other positional configurations.

Based on the determined 3D locations of the features of the calibration object, the capture device calibration system may determine a set of intrinsic parameter values for one or more of the capture devices in the set of capture devices (e.g., including for the particular capture device). As used herein, a set of "intrinsic parameters" may refer to any data (e.g., parameters, characteristics, matrices, etc.) representative or descriptive of geometric, optical, physical, or other properties of a specific capture device or component thereof (e.g., a lens of the specific capture device). As such, each capture device in the set of capture devices, including the particular capture device, may be associated with a distinct set of "intrinsic parameter values" specific to that capture device (i.e., numerical values specific to the particular capture device for each of the intrinsic parameters in the set of intrinsic parameters). For example, respective sets of intrinsic parameter values may represent properties specific to a capture device such as a focal length of the capture device, an image sensor format of the capture device, a principal point of the capture device, scale factors associated with the capture device, skew coefficients between axes upon which images are captured by the capture device, lens distortion of a lens of the capture device, and so forth as may serve a particular implementation. Thus, as used herein, "calibration" or "intrinsic calibration" of a capture device may refer to determining (e.g., by way of various operations such as those described herein) a distinct set of intrinsic parameter values specific to the capture device.

Along with determining the set of intrinsic parameter values for the particular capture device as described above, the capture device calibration system may further determine other respective sets of intrinsic parameter values for other particular capture devices in the set of capture devices based on the same datasets and 3D locations that have been accessed and determined. For example, if each of the capture devices in the set of capture devices is progressively relocated so as to be positioned in the center position of the formation when one dataset is captured and to be positioned in each of the peripheral positions around the center position when other datasets are captured, then the plurality of datasets may include sufficient data for the capture device calibration system to use to determine distinct sets of intrinsic parameter values for all of the capture devices in the set of capture devices.

As will be described in more detail below, the intrinsic parameter values for each capture device in the set of capture devices may be determined based on data in the plurality of datasets in any manner as may serve a particular implementation. For instance, in some examples, the capture device calibration system may set up a first overdetermined system of equations representative of the set of intrinsic parameters for the particular capture device (e.g., as well as representative of respective sets of intrinsic parameters for the other capture devices), and may perform an optimization (e.g., a least squares optimization or the like) with respect to the first overdetermined system of equations to determine the set of intrinsic parameter values for the particular capture device. In some examples, the equations in the first overdetermined system of equations may be based on the determined 3D locations of the features of the calibration object positioned in front of the formation.

Once the set of capture devices has been intrinsically calibrated (i.e., once respective sets of intrinsic parameter values have been determined for each of the capture devices in the set of capture devices), it may be desirable to further calibrate the capture devices with respect to their respective positions in a particular configuration in which the capture devices are to be used (e.g., used to capture data for generating virtual reality content or another such application). Specifically, the capture devices may be set up in a volumetric capture configuration in which each capture device in the set of capture devices is positioned with respect to a capture zone so as to capture surfaces of objects (e.g., real-world objects that are to be three-dimensionally modeled using volumetric alignment techniques) included within the capture zone from a distinct vantage point.

With the intrinsically calibrated capture devices in such a configuration, respective sets of extrinsic parameter values for each capture device representative of the position of the capture device in the volumetric capture configuration may be determined. As used herein, a set of "extrinsic parameters" may refer to any data (e.g., parameters, characteristics, matrices, etc.) representative or descriptive of coordinate system transformation properties (e.g., rotational properties, translation properties, etc.) between a coordinate system specific to a specific capture device and a global coordinate system shared by all the capture devices in a particular configuration (e.g., a volumetric capture configuration). As such, each capture device in the set of capture devices (i.e., including the particular capture device) may be associated with a distinct set of "extrinsic parameter values" (e.g., numerical values for each of the extrinsic parameters in the set of extrinsic parameters) that is specific to that capture device and its position in the particular configuration and that may be used to transform data captured by the capture device to a global coordinate system. Data captured by capture devices that have been extrinsically calibrated in this way may then be volumetrically aligned with data captured by other extrinsically calibrated capture devices based on their respective sets of extrinsic parameter values.

In order to determine respective sets of extrinsic parameter values for the particular capture device and/or the other capture devices in the set of capture devices, the capture device calibration system may access an additional dataset captured by the set of capture devices while the set of capture devices is set up in a volumetric capture configuration, and may determine 3D locations of the features of the calibration object while the set of capture devices is set up in the volumetric capture configuration and the calibration object is positioned within the capture zone. For example, as described above in relation to when the set of capture devices was set up in the intrinsic calibration configuration, each 3D location may be determined based on different representations of the calibration object from different view angles associated with different locations in which the capture devices are positioned with respect to the capture zone in the volumetric capture configuration. Based on the 3D locations of the features of the calibration object determined using the set of capture devices while the set of capture devices is set up in the volumetric capture configuration, the capture device calibration system may set up a second overdetermined system of equations representative of the set of intrinsic parameters and a set of extrinsic parameters for the particular capture device. However, because intrinsic parameter values for each of the capture devices have already been determined as described above, the capture device calibration system may fix variables within the second overdetermined system of equations that correspond to the respective sets of intrinsic parameter values to be equal to values corresponding to the sets of intrinsic parameter values that have already been determined. In other words, the intrinsic parameter values determined using the positional configurations described above may be used as constants (i.e., rather than variables) in the equations used to determine the extrinsic parameter values associated with the volumetric capture configuration.

While the variables that correspond to the respective sets of intrinsic parameters are fixed to the values corresponding to the determined sets of intrinsic parameter values, the capture device calibration system may perform an optimization with respect to the second overdetermined system of equations. In this way, the capture device calibration system may determine the extrinsic parameter values for the particular capture device (e.g., as well as for the other capture devices) while the set of capture devices is set up in the volumetric capture configuration.

Because conventional methods of intrinsically calibrating capture devices are optimized to individual capture devices (e.g., without regard to the accuracy of derived intrinsic parameter values in a multi-view alignment system associated, for example, with the volumetric capture configuration described above), there may be poor point-to-point or surface-to-surface alignment when image alignment is attempted to reconstruct, for example, volumetric objects and/or to otherwise model data captured using conventionally calibrated capture devices. This is because, while a relatively rough estimate of depths of calibration object features may be sufficient for calibrating individual capture devices (e.g., a rough estimate based on detected depth data, an apparent size of the calibration object, etc.), such an estimate may be insufficiently accurate for calibrating capture devices that are to be used in a multi-view system for image alignment. Accordingly, a benefit of the capture device calibration methods and systems described herein is that 3D locations (e.g., including depth parameters) of features of a calibration object are determined based on geometric differences of frames captured from different view angles of different locations at the same time (e.g., or synchronously at approximately the same time). As will be described in more detail below, determining depth of features in this manner (i.e., in accordance with capture device calibration methods and systems described herein) may be significantly more accurate, leading to superior intrinsic and extrinsic parameter values and superior point-to-point and surface-to-surface volumetric alignment.

Additionally, another benefit of capture device calibration methods and systems described herein relates to the challenge of bootstrapping intrinsic calibration of capture devices all of which may previously be uncalibrated. Specifically, it may be difficult to calibrate uncalibrated capture devices (i.e., capture devices whose intrinsic parameter values have not yet been determined) if no pre-calibrated capture devices (i.e., capture devices whose intrinsic parameter values have already been accurately determined) are available. However, capture device calibration methods and systems described herein provide a solution to this calibration bootstrapping challenge, as methods and systems described herein allow for calibration of uncalibrated capture devices to be performed using only the uncalibrated capture devices (i.e., without requiring use of any precalibrated capture devices). For example, as described above, a plurality of datasets may be captured in relation to a progressive set of different positional configurations in which a set of uncalibrated capture devices are progressively relocated to form the positional configurations so as to have a turn at (i.e., to participate in capturing at least one dataset in the plurality of datasets from) each position in a formation implemented by the positional configuration.

It will also be understood that, in certain implementations of methods and systems described herein, pre-calibrated capture devices may be employed. For example, if precalibrated capture devices that have been calibrated using methods and systems described herein are available to be used at the peripheral positions of the calibration formation, uncalibrated capture devices may be intrinsically calibrated based on respective single datasets (i.e., rather than the plurality of datasets described above) that are captured while the uncalibrated capture devices are positioned, in turn, at the center position of the formation. In other words, if capture devices pre-calibrated using methods and systems described herein are used at the peripheral positions, a capture device at the center position of the formation may be intrinsically calibrated without having to be progressively relocated to all the positions of the formation.

Various embodiments will now be described in more detail with reference to the figures. The disclosed systems and methods may provide one or more of the benefits mentioned above and/or various additional and/or alternative benefits that will be made apparent herein.

FIG. 1 illustrates an exemplary capture device calibration system 100 ("system 100"). As shown, system 100 may include, without limitation, a frame capture facility 102, a processing facility 104, and a storage facility 106 selectively and communicatively coupled to one another. It will be recognized that although facilities 102 through 106 are shown to be separate facilities in FIG. 1, facilities 102 through 106 may be combined into fewer facilities, such as into a single facility, or divided into more facilities as may serve a particular implementation. Each of facilities 102 through 106 may be distributed between multiple devices and/or multiple locations as may serve a particular implementation. Additionally, one or more of facilities 102 through 106 may be omitted from system 100 in certain implementations, while additional facilities may be included within system 100 in the same or other implementations. Each of facilities 102 through 106 will now be described in more detail.

Frame capture facility 102 may include any suitable hardware, software, or combination thereof (e.g., capture devices, communication interfaces with capture devices, computing resources configured to process data received from capture devices, etc.) that may be configured to access a plurality of datasets captured by a set of capture devices that are progressively relocated to form a plurality of different positional configurations each implementing a formation that includes a center position and one or more peripheral positions around the center position. For example, frame capture facility 102 may access the plurality of the datasets by directing a set of capture devices separate from system 100 (i.e., not integrated with system 100) to capture and/or send the datasets to system 100 or by requesting and receiving the datasets from another system or another component of system 100 (e.g., storage facility 106) that is storing data captured by the set of capture devices. In other examples, the set of capture devices may be integrated with frame capture facility 102 (i.e., may be included within system 100) and frame capture facility 102 may access the plurality of datasets by capturing the datasets by way of the integrated set of capture devices.

Each dataset in the plurality of datasets accessed by frame capture facility 102 may include a respective plurality of synchronized sets of frames captured by the set of capture devices while the set of capture devices is set up in a respective positional configuration within the plurality of different positional configurations. For example, the plurality of different positional configurations may include a first positional configuration in which a particular capture device included in the set of capture devices is set up at the center position, and one or more other positional configurations in which the particular capture device is set up at the one or more peripheral positions around the center position.

As used herein, a "synchronized set of frames" may refer to a set of still images captured by different capture devices in the set of capture devices at approximately the same time (e.g., captured synchronously within less than about one second from one another or, more preferably, within less than a few milliseconds from one another). The frames in a synchronized set of frames may all depict a same object or objects (or features of an object or objects) from different view angles (e.g., different perspectives, vantage points, etc.) such that an accurate 3D location of the object or objects may be determined based on the geometry of the different view angles, as will be described in more detail below. Accordingly, a "plurality of synchronized sets of frames" may refer to multiple such synchronized sets of frames, which may be captured consecutively and in rapid sequence as a calibration object is moved around in the view of the set of capture devices, as will be further described below. Thus, for example, a dataset that includes a plurality of synchronized sets of frames may include a large number (e.g., hundreds, thousands, or more) of synchronized sets of frames from which accurate intrinsic parameter values and extrinsic parameter values may be determined using the methods described herein.

Processing facility 104 may include one or more physical computing devices (e.g., the same hardware and/or software components included within frame capture facility 102 and/or components separate from those of frame capture facility 102) that process the plurality of datasets accessed by frame capture facility 102 so as to determine 3D locations of features of a calibration object positioned in front of the formation of capture devices, and, based on the determined 3D locations, determine respective sets of intrinsic and/or extrinsic parameter values for each capture device (e.g., including the particular capture device). As used herein, a "3D location" of something such as a feature of a calibration object may refer to a precise point in space, with respect to a local or global coordinate system, of that thing. For example, a 3D location may not only refer to where a feature of a calibration object is with respect to a 2D representation of the feature (e.g., which pixel or pixels of a capture device the feature corresponds to), but may further refer to a precise depth (e.g., distance from the capture device) at which the feature is located.

In order to accurately determine the 3D locations, processing facility 104 may determine each 3D location based on different representations of the calibration object from different view angles associated with the center position and the one or more peripheral positions within the formation. Thus, as described above, the geometry of the different view angles may be used to determine the depth aspect of the 3D locations rather than, for example, an estimate of the depth based on an apparent size of the calibration object, based on depth data determined by a time-of-flight or stereoscopic depth triangulation technique or the like, or based on other such means that have conventionally been used to estimate the depth of objects. The different representations used by processing facility 104 to determine the 3D locations may be depicted by frames included in multiple distinct datasets (e.g., multiple distinct synchronized sets of frames). For example, the different representations may come from both a first synchronized set of frames captured while the set of capture devices is set up in the first positional configuration and in one or more other synchronized sets of frames captured while the set of capture devices is set up in the one or more other positional configurations.

Storage facility 106 may maintain frame data 108, calibration data 110, and/or any other data received, generated, managed, maintained, used, and/or transmitted by facilities 102 and 104. Frame data 108 may include image data captured and/or otherwise accessed by frame capture facility 102 and upon which 3D locations and intrinsic parameter values may be determined. Calibration data 110 may include data used by processing facility 104 and/or data generated by processing facility 104 in the determination of 3D locations, intrinsic parameter values, and the like. For example, calibration data 110 may include respective sets of intrinsic and/or extrinsic parameter values for each capture device in the set of capture devices that have been determined by processing facility 104. Storage facility 106 may further include any other data as may be used by facilities 102 and 104 to intrinsically or extrinsically calibrate the capture devices in the set of capture devices.

System 100 may perform intrinsic calibration of the set of capture devices in accordance with the operations described above performed by facilities 102 and 104. Additionally, it will be understood that facility 102, facility 104, and/or other facilities not explicitly shown may also be included within system 100 for performing extrinsic calibration of the set of capture devices. Examples of how system 100 may perform both intrinsic and extrinsic calibration of a set of uncalibrated capture devices will be described below.

As described above, system 100 may calibrate capture devices in a highly accurate manner by determining 3D locations of features of a calibration object based on geometric differences of frames captured synchronously from different view angles, rather than by conventional techniques that are less precise, reliable, or accurate. In this way, volumetric alignment of data captured by different capture devices may be made possible or may be significantly improved from conventional techniques. To illustrate this principle, FIGS. 2 and 3 show how geometric techniques may be used to accurately determine a 3D location of an object.

Figure 2:
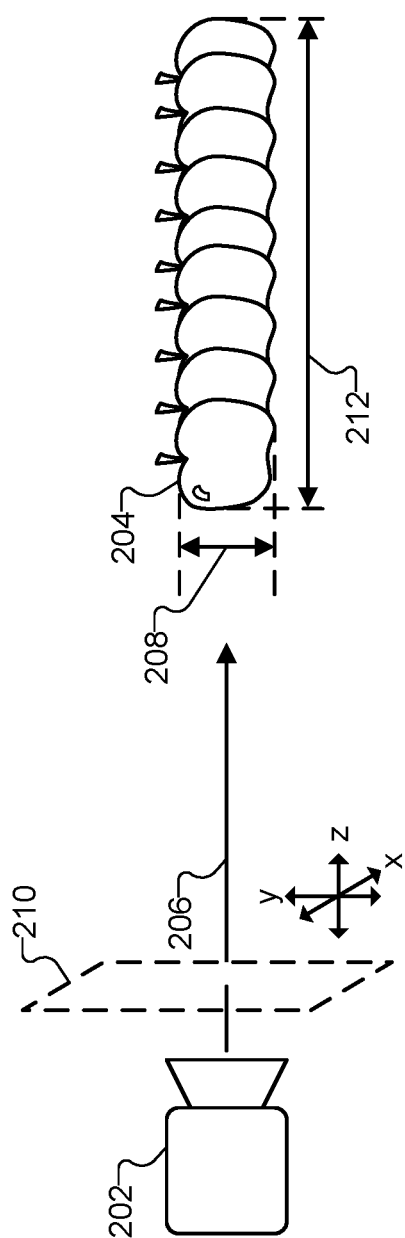
FIG. 2 illustrates an exemplary capture device capturing data for an object from a single view angle of a single position according to principles described herein.

FIG. 2 illustrates an exemplary capture device 202 that is capturing data for an object 204 (e.g., an apple in this example) from a single view angle of a single position. As shown, capture device 202 may be directed at object 204 so as to have a straight-on view of object 204 where a viewing ray 206 of capture device 202 intersects object 204 directly (e.g., at approximately 90°). In the configuration illustrated in FIG. 2, there may be a very small uncertainty 208 about a location of object 204 with respect to one or more dimensions orthogonal to viewing ray 206. For example, along an x-axis and a y-axis of a 2D plane 210 oriented orthogonal to viewing ray 206 (which may extend along a z-axis of 2D plane 210, as shown) and with respect to which capture device 202 captures a representation of object 204, certainty about where object 204 is located may be accurate down to a pixel or sub-pixel level. However, as is further illustrated by FIG. 2, there may be a much larger uncertainty 212 about a location of object 204 with respect to a depth dimension parallel to viewing ray 206 (i.e., along the z-axis). Regardless of how accurately object 204 may be captured with respect to the x-axis and the y-axis of the 2D plane of capture device 202, it may be significantly more difficult, based on the geometry (e.g., the respective positioning, etc.) of single capture device 202 and object 204 to determine the z-axis depth of object 204. Using known data about the size of object 204 or using a stereoscopic triangulation technique or other depth capture technique to determine the distance from capture device 202 to object 204 may yield a rough estimate of the depth. However, as illustrated by uncertainty 212, this estimate may include a relatively large amount of error, especially in comparison to the accuracy with which the other dimensions of the 3D location of object 204 may be determined.

Figure 3:
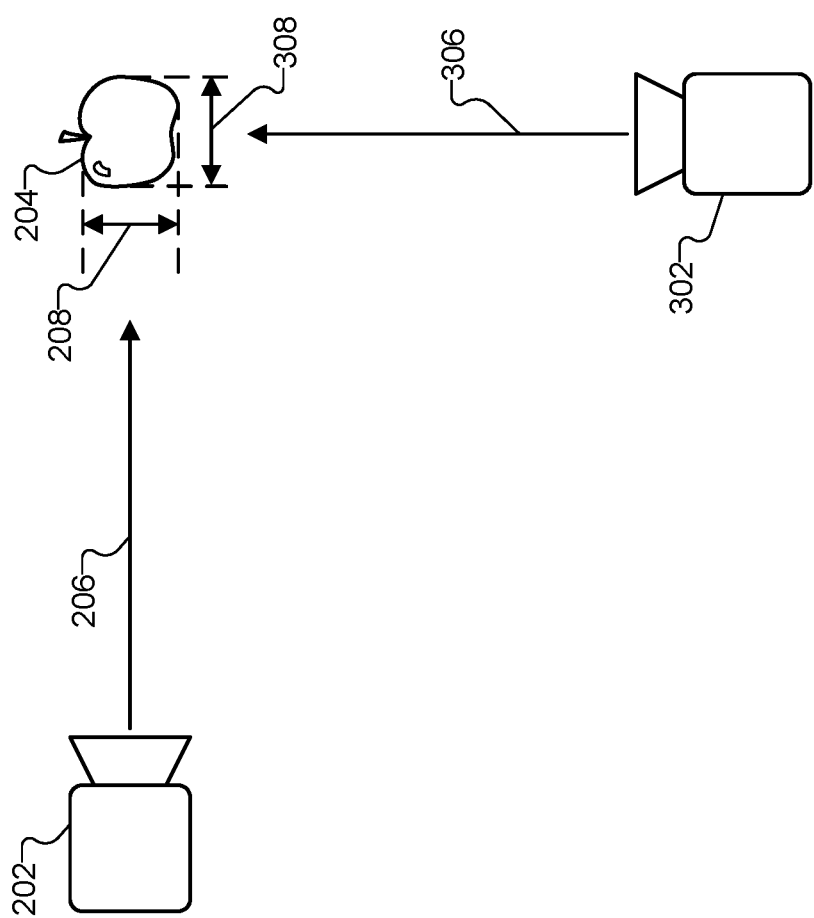
FIG. 3 illustrates the capture device of FIG. 2 along with another exemplary capture device synchronously capturing data for the object from different view angles of different positions according to principles described herein.

To decrease this error and achieve a more accurate depth for object 204, FIG. 3 shows how a second capture device 302 may be used to synchronously capture data for object 204 from a different view angle of a different position of capture device 302. Specifically, as shown in FIG. 3, capture device 302 may located so as to have a view angle that perfectly complements the view angle of capture device 202 because a viewing ray 306 of capture device 302 having a straight-on view of object 204 is orthogonal to viewing ray 206. Thus, as shown, an uncertainty 308 that is as small and precise as uncertainty 208 has replaced the relatively large uncertainty 212 that is associated with the capture of object 204 by capture device 202 alone.

As will be made apparent below, some objects or features of objects (e.g., objects or features that that are thin and flat) may not be practically discernible from completely orthogonal view angles such as those associated with capture devices 202 and 302, making it impossible or impractical in certain examples for capture devices to be arranged as capture devices 202 and 302 are in FIG. 3. Regardless, it will be understood that the principle of decreasing uncertainty along certain dimensions by strategically positioning multiple capture devices to have different view angles of a same object may apply even if the view angles are not perfectly orthogonal. For example, capture devices having view angles significantly less than an orthogonal view angle (e.g., view angles of approximately 30° to 45° in some examples) may each individually decrease the uncertainty of a depth determination to at least some degree. Moreover, in some examples, a plurality of capture devices set up to have such view angles may collectively decrease the uncertainty of the depth determination to at least the same degree as a capture device set up to have an orthogonal view angle.

Figure 4:
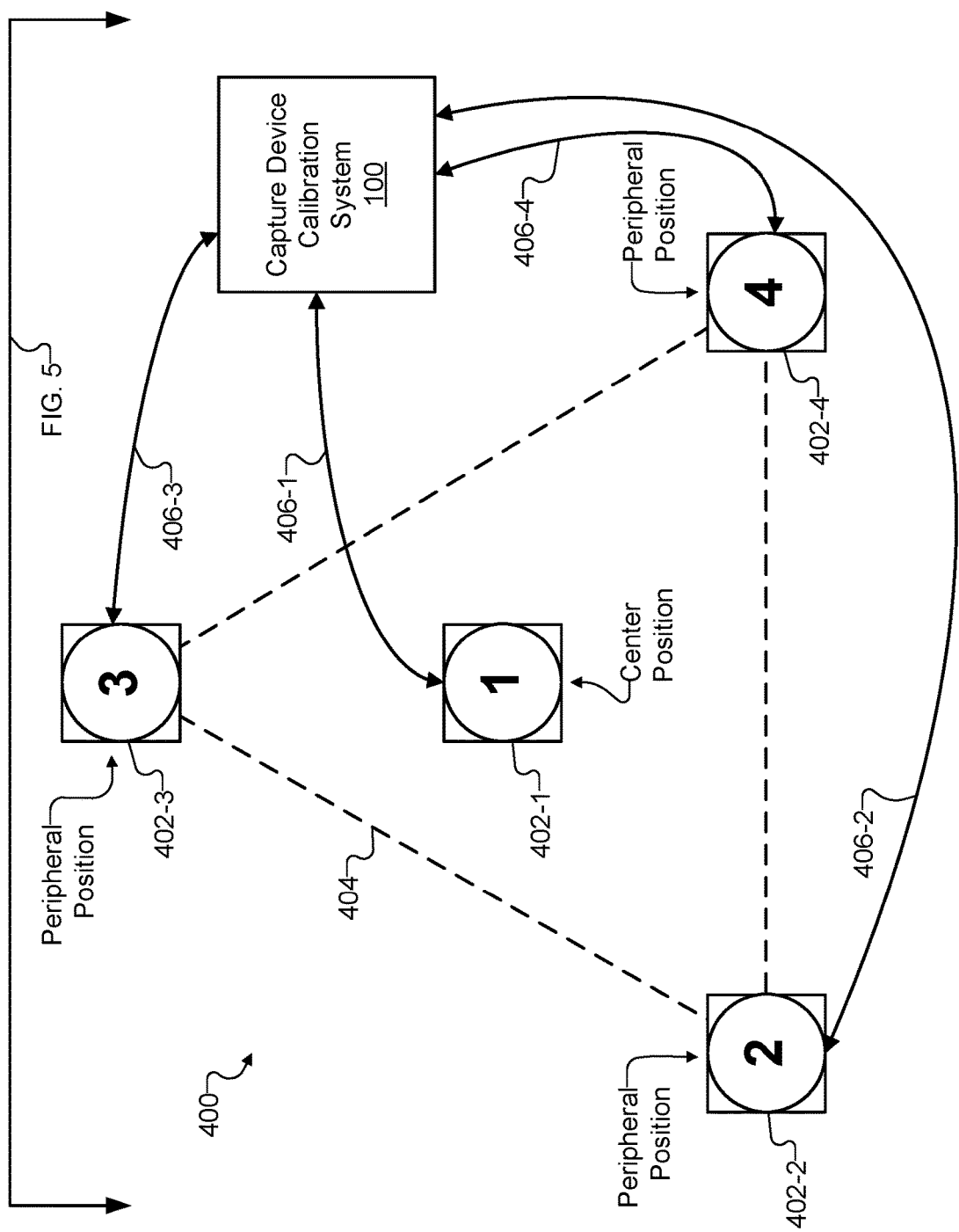
FIG. 4 illustrates a front view of an exemplary positional configuration in which an exemplary set of capture devices is set up to capture a dataset that is accessed by the capture device calibration system of FIG. 1 according to principles described herein.

To illustrate a configuration of capture devices that, collectively, may significantly decrease the uncertainty of a depth determination for features of a calibration object, FIG. 4 shows a front view of an exemplary positional configuration 400 in which an exemplary set of capture devices 402 (e.g., four capture devices 402-1 through 402-4, which are further labeled with respective identification numbers 1 through 4 as shown) are set up to capture a dataset that may be accessed by system 100 (e.g., as the dataset is being captured, after the dataset has been captured, etc.).

As shown, positional configuration 400 implements a formation 404 that includes a center position (i.e., a position at which capture device 402-1 is set up in positional configuration 400) and three peripheral positions (i.e., positions at which capture devices 402-2 through 402-4 are set up in positional configuration 400). More particularly, formation 404 in FIG. 4 includes four positions comprising the center position and the three peripheral positions where the three peripheral positions form vertices of a triangle that encloses the center position as viewed from a position of a calibration object in front of the formation (not explicitly shown in FIG. 4, but which will be illustrated below such as in the top view of FIG. 5).

While formation 404 includes one center position and three peripheral positions so as to be implemented by a configuration of four capture devices 402, in other examples, other configurations of other numbers of capture devices may implement other types of formations. For example, a two capture device formation may be implemented by a configuration of two capture devices positioned at a center position and a single peripheral position, a three capture device formation may be implemented by a configuration of three capture devices positioned at a center position and two peripheral positions, and so forth.

If the nature of a calibration object in front of the formation is such that the calibration cannot be readily detectable from an orthogonal side view (e.g., if the calibration object is akin to a feature of a flat surface such as a corner of a checkerboard pattern), capture devices set up at peripheral positions in a formation may have angled views from angles significantly less than orthogonal angles (i.e., such as the orthogonal side view illustrated in FIG. 3). Accordingly, it may be advantageous to have more than one capture device at more than one peripheral position of a formation so that different peripheral capture devices may complement one another from different view angles around the center capture device to reduce depth uncertainty to a large extent. To this end, a formation with at least four capture devices such as formation 404 illustrated in FIG. 4 may be advantageous because capture devices 402-2 through 402-4 set up at the three peripheral positions may complement one another to reduce uncertainty in depth determinations detected by capture device 402-1 to be very low (e.g., practically zero uncertainty).

While four capture devices may be sufficient in certain examples, it will be understood that, just as fewer than four capture devices may be used as described above, a formation having greater than four capture devices may also be used in certain implementations. For instance, a five capture device formation may be implemented by a configuration of five capture devices positioned at a center position and four peripheral positions forming a quadrilateral around the center position, a six capture device formation may be implemented by a configuration of six capture devices positioned at a center position and five peripheral positions forming a pentagon around the center position, and so forth as may serve a particular implementation.

Capture devices 402 may be implemented as any devices as may serve a particular implementation. For example, capture devices 402 may include any type of video capture hardware (e.g., digital video cameras and/or associated equipment, etc.), image capture hardware (e.g., digital still cameras, etc.), or the like. In some examples, capture devices 402 may be configured to capture color data (e.g., red/green/blue ("RGB") video or image data), while in other examples, capture devices 402 may be configured to capture monochrome (e.g., grayscale) video or image data, infrared video or image data, or other types of video or image data associated with any frequency of light as may serve a particular implementation. Additionally, capture devices 402 may represent or be associated with depth capture devices (e.g., time-of-flight capture devices such as Light Detection and Ranging ("LIDAR") devices, etc.), rigidly attached combinations of color and depth capture devices, or other suitable optical systems.

In the example of FIG. 4, system 100 is shown to be separate from capture devices 402 but communicatively coupled to each of capture devices 402 by way of respective communication links 406 (e.g., communication links 406-1 through 406-4 for capture devices 402-1 through 402-4, respectively). Communication links 406 may be implemented in any suitable way such as by wired or wireless direct connections, by way of one or more network connections, by daisy chaining connections between capture devices 402, and/or by way of other communication methods as may serve a particular implementation. Along with carrying data captured by capture devices 402 and accessed by system 100, communication links 406 may also carry additional signals as may serve a particular implementation. For instance, communication links 406 may be used to carry synchronization signals (e.g., timing signals for setting and synchronizing clocks, capture trigger signals, etc.) to facilitate capture devices 402 in synchronously capturing the frames in each synchronized set of frames included in a particular dataset captured by capture devices 402. As mentioned above, it will be understood that, in some examples, capture devices 402 may be integrated with (e.g., included within) system 100 such that, for example, data provided over communication links 406 is provided from capture devices 402 included within frame capture facility 102 to computing resources included within processing facility 104.

By using synchronous sets of frames captured using capture devices 402 in positional configuration 400, system 100 may determine the 3D locations of the features of a calibration object accurately based on different representations of the calibration object from the different view angles associated with the different positions of formation 404. For example, system 100 may determine, for each particular feature of the calibration object and based on a representation of the calibration object captured by the capture device set up at the center position of the formation (e.g., capture device 402-1 in the example of positional configuration 400), a 2D location of the particular feature with respect to a 2D plane oriented orthogonally with a viewing ray of the capture device set up at the center position of the formation. In other words, the capture device set up at the center position of formation 404 (e.g., capture device 402-1 in positional configuration 400) may be analogous to capture device 202 in the example of FIGS. 2 and 3 in that the center capture device may have a straight-on view of the calibration object (e.g., a view of the calibration object in which the viewing ray of the center capture device intersects the calibration object at an approximately orthogonal angle).

Moreover, system 100 may further determine, for each particular feature of the calibration object and based on one or more representations of the calibration object captured by the capture devices set up at the one or more peripheral positions of the formation (e.g., capture devices 402-2 through 402-4 in positional configuration 400), a depth of the particular feature with respect to the capture device set up at the center position. In other words, the capture devices set up at the peripheral positions of formation 404 (e.g., capture devices 402-2 through 402-4) may individually and/or collectively be analogous to capture device 302 in the example of FIG. 3 in that the peripheral capture devices may have angled views of the feature of the calibration object that complement the straight-on view of the center capture device. For example, the angled views of the feature of the calibration object that the peripheral capture devices have may collectively decrease the uncertainty of the depth of the feature from the center capture device to a similar degree as would a capture device having an orthogonal view angle with respect to the feature of the calibration object (which, as mentioned above, may not be realized in practice if, for example, the feature of the calibration object is a corner printed on a flat checkerboard pattern that is undiscernible from an orthogonal side view of the calibration object).

Figure 5:
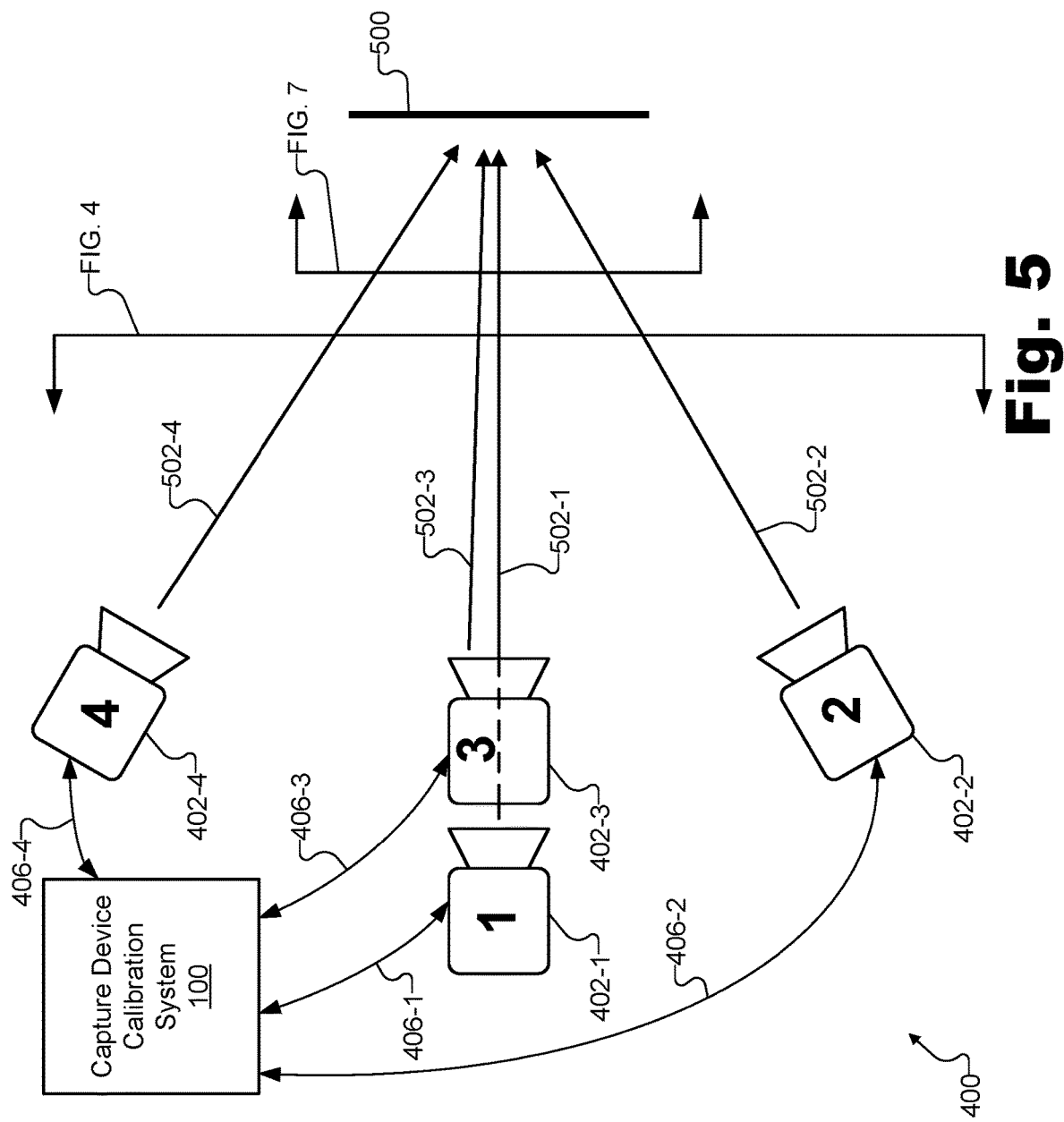
FIG. 5 illustrates a top view of the exemplary positional configuration of FIG. 4 along with an exemplary calibration object positioned in front of a formation implemented by the positional configuration according to principles described herein.

As shown by the indicator at the top of FIG. 4, FIG. 5 illustrates a top view of positional configuration 400. Additionally, FIG. 5 shows an exemplary calibration object 500 positioned in front of formation 404 implemented by positional configuration 400.

Calibration object 500 may be implemented as any calibration object that may serve a particular implementation. For instance, calibration object 500 may be a thin, flat, stiff object (e.g., a compressed particle board, a piece of stiff cardboard, etc.) that includes a pattern configured to be readily detectable by a feature detecting algorithm. For example, a checkerboard pattern with readily discernable corners may be used in certain examples. In other examples, patterns of dots, circles, concentric circles, or any other discernable features may also be used. Additionally, objects that are curved (i.e., that are not flat) may also be used in certain examples where the objects include patterns configured to be readily detectable by feature detecting algorithms. In certain implementations, point source light emitting devices or light reflecting devices (e.g., including light emitting diode ("LED") elements, liquid crystal display ("LCD") elements, or other suitable light emitting or light reflecting elements) may be mounted on a rigid frame for use as a calibration object. In some examples, a pattern (e.g., a checkerboard pattern or the like) may be printed onto a piece of material (e.g., a paper material, a vinyl or semi-vinyl material, etc.) that is smoothly applied to a stiff or rigid object (e.g., such as a flat board) so as to not trap air bubbles between the object and the printed material.

Figure 6:
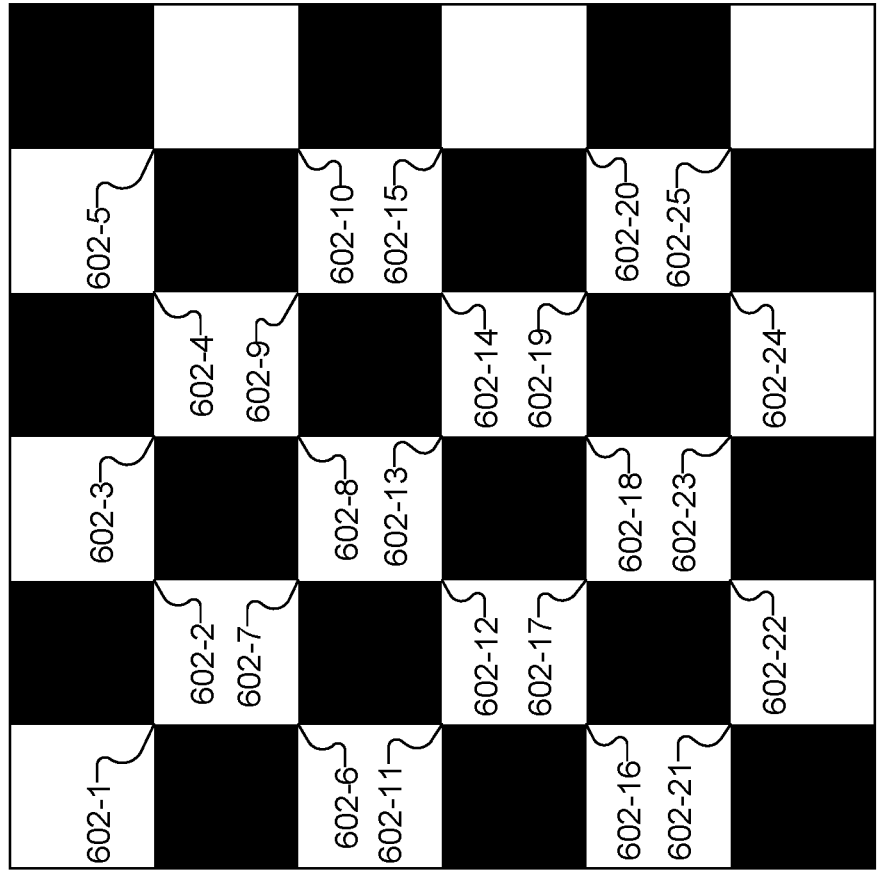
FIG. 6 illustrates an exemplary implementation of the calibration object of FIG. 5 according to principles described herein.

FIG. 6 illustrates an exemplary implementation of calibration object 500. As shown in FIG. 6, calibration object 500 may appear as a checkerboard pattern having black and white squares (or any other suitable shapes) that meet at a plurality of corners that may be easily discernible or recognizable by graphics processing software. Thus, a plurality of features 602 of calibration object 500 (e.g., features 602-1 through 602-25) may be points on the pattern where a plurality of squares of the checkerboard pattern meet. For instance, as illustrated, each of features 602 may be points on the checkerboard pattern where four squares of the checkerboard pattern (i.e., two diagonal white squares and two diagonal black squares) all meet at a corner.

In certain examples, outer corners of the shapes (i.e., corner points around the edge of calibration object 500 where less than four corners meet) may also be recognized as features. While the checkerboard pattern of FIG. 6 is shown to include a 6×6-square pattern, it will be understood that any number of squares or other suitable shapes may be used for the checkerboard pattern as may serve a particular implementation including different numbers of squares or other shapes along the length of the pattern and the width. Additionally, it will be understood that calibration object 500 may be any suitable size, such as a size that is large enough to be clearly visible to capture devices 402 (e.g., so that features 602 may be readily distinguished and identified) and small enough to fully fit within frames captured by one or more of capture devices 402 (e.g., so that edges of calibration object 500 may be used to identify and distinguish particular features 602 from one another). It will be understood that features other than corners (e.g., readily discernable features included on calibration objects other than a checkerboard calibration object such as calibration object 500) may be identified and distinguished in any manner that suits the particular type of feature being used.

Figure 7:
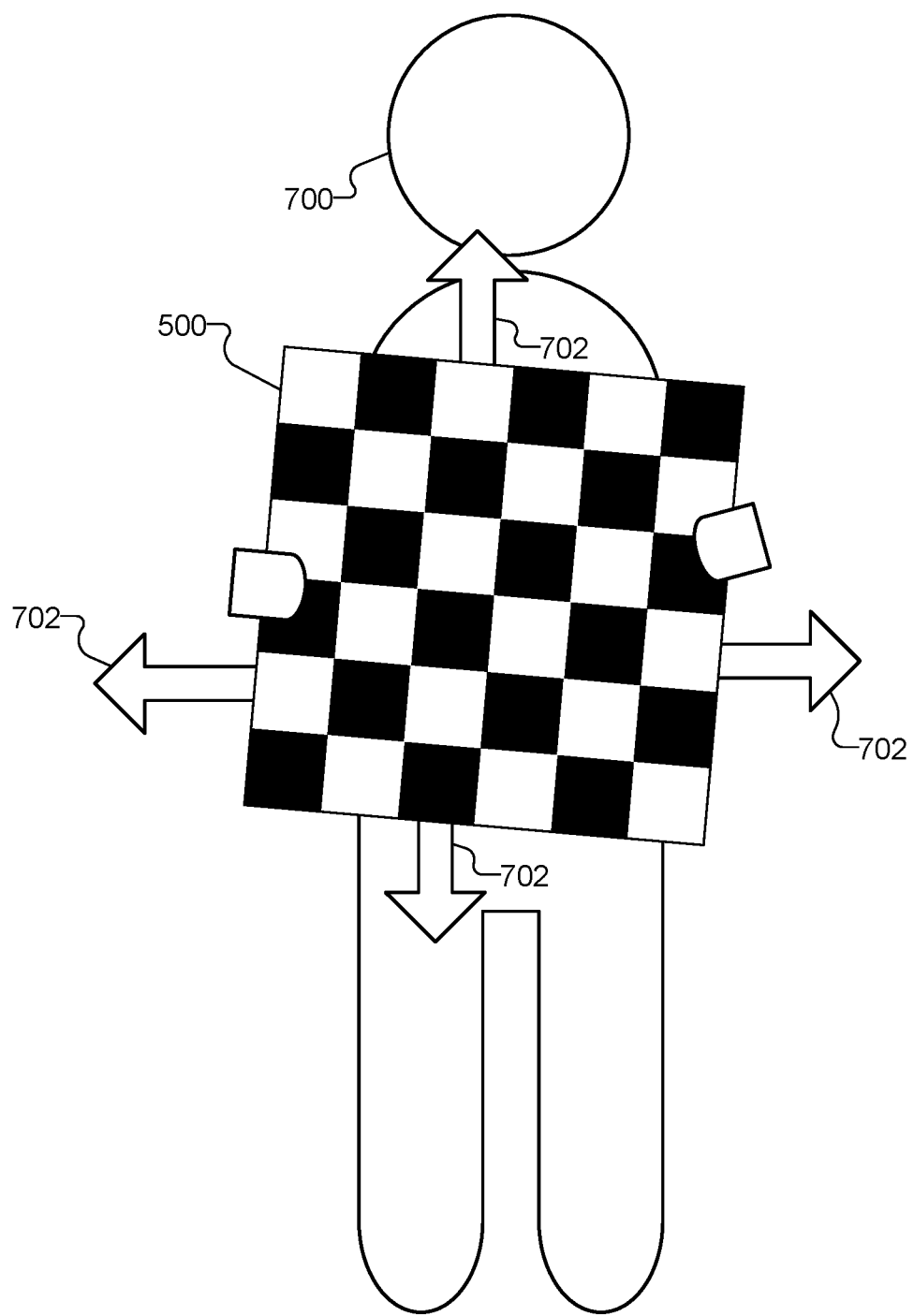
FIG. 7 illustrates an exemplary manner in which 3D locations of features of the calibration object may be determined in accordance with a dense sampling technique facilitated by an operator overseeing calibration of the set of capture devices according to principles described herein.

Returning to FIG. 5, respective indicators placed between positional configuration 400 and calibration object 500 indicate that FIG. 4 illustrates the front view of positional configuration 400 (as described above), while FIG. 7 illustrates calibration object 500 as it may be positioned in front of formation 404 of capture devices 402. Specifically, as shown, FIG. 7 illustrates an exemplary manner in which 3D locations of features 602 of calibration object 500 may be determined in accordance with a dense sampling technique facilitated by an operator 700 overseeing calibration of capture devices 402.

Calibration object 500 may be positioned in front of formation 404 of capture devices 402 such that the capture device at the center position of formation 404 (e.g., capture device 402-1 in positional configuration 400) has a straight-on view of calibration object 500. As used herein, a capture device may have a "straight-on" view of a flat calibration object such as calibration object 500 when the calibration object is oriented so as to be approximately orthogonal with a viewing ray of the capture device. For example, capture device 402-1 is shown to have a straight-on view of calibration object 500 in FIG. 5 because calibration object 500 is oriented (e.g., held by operator 700) so as to be approximately orthogonal with a viewing ray 502-1 of capture device 402-1 (i.e., so that the checkerboard pattern is directly facing capture device 402-1). As will be understood, calibration object 500 may be held in position by an operator 700 or may be mounted on a holding fixture, or otherwise be free standing or positionable in front of formation 404.

In contrast, as further illustrated by FIG. 5, capture devices 402-2 through 402-4 (e.g., the peripheral capture devices in the example of positional configuration 400) may each have angled views of calibration object 500. As used herein, a capture device may have an "angled" view of a flat calibration object such as calibration object 500 when the calibration object is oriented so as to not be approximately orthogonal with a viewing ray of the capture device (i.e., to be at a non-orthogonal angle to the viewing ray). For example, as shown in FIG. 5, capture devices 402-2 through 402-4 may each have angled views of calibration object 500 because calibration object 500 is oriented (e.g., held by operator 700) so as to be non-orthogonal or angled with respect to respective viewing rays 502-2 through 502-4 of capture devices 402-2 through 402-4. (It will be understood that capture device 402-3 has an angled view of calibration object 500 pointing downward toward calibration object 500 even though, from the top view perspective of FIG. 5, capture device 402-3 may appear to have a straight-on view similar to that of capture device 402-1.)

Because calibration object 500 may be held in front of formation 404 by operator 700 rather than by more rigid or precise means such as a tripod or the like, it will be understood that the respective angles of the straight-on and angled views of calibration object 500 from capture devices 402 may change over time and may only approximate ideal angles. For instance, while operator 700 may attempt to maintain calibration object at a perfect orthogonal angle to viewing ray 502-1 (i.e., facing the capture device at the center position), it will be understood that the angle of calibration object 500 may fluctuate and be slightly offset from the orthogonal ideal due to human error. To correct this fluctuation and/or inaccuracy in angle, in certain examples calibration object 500 may be positioned (e.g., fixed in place) by a tripod or other means instead of held by an operator such as operator 700. However, for practical reasons, it may be advantageous for calibration object 500 to be held by operator 700 because operator 700 may easily and conveniently move calibration object 500 in various movements 702 to facilitate system 100 in performing a dense sampling technique, which will now be described.

Figure 8:
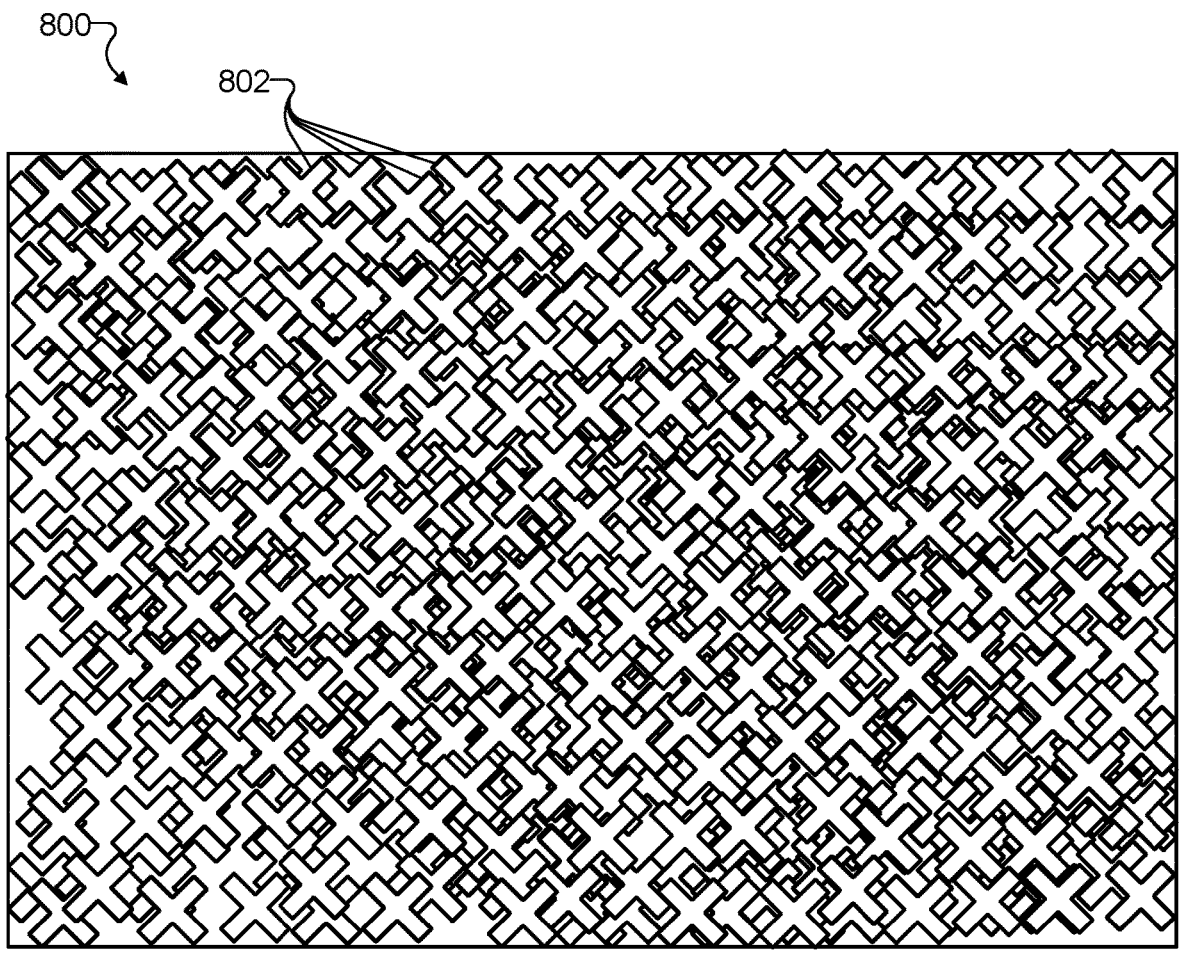
FIG. 8 illustrates exemplary samples sampled in accordance with a dense sampling technique across all parts of a lens of a capture device according to principles described herein.

FIG. 8 illustrates exemplary samples sampled in accordance with a dense sampling technique across all parts of a lens of a capture device. In order to determine accurate intrinsic parameter values for a particular capture device (i.e., in order to intrinsically calibrate the particular capture device so as to eliminate lens distortion for the particular capture device and so forth), it may be desirable for system 100 to characterize not just a part of the lens of the particular capture device (e.g., a center part or the like), but to characterize all parts of the entire lens (i.e., including the center part and other parts extending to outer edges of the lens). In the example of calibration object 500, which is shown to have 25 features 602 in FIG. 6, capturing a single synchronized set of frames of the calibration object may thus provide up to 25 data points related to 25 points on the lens used to capture the image of calibration object 500 (i.e., corresponding to 25 pixels of an image sensor that captures light processed by the lens). However, because the lens of the particular capture device may process light for millions of pixels on the image sensor, it may not be adequate to characterize the lens based on only 25 data points associated with 25 pixels of the particular capture device.

Instead, it may be desirable to capture a significantly larger number of data points associated with a significantly larger number of pixels corresponding to points spread across all parts of the lens of the particular capture device to fully and accurately characterize the lens. To this end, the determining of the 3D locations of the features of the calibration object upon which the set of intrinsic parameter values will be based may be performed in accordance with a dense sampling technique in which representations of the calibration object are captured repeatedly until the features of the calibration object have been densely captured across all parts of the lens of the particular capture device set up at the center position of the formation. For example, each of capture devices 402 in positional configuration 400 may be configured to synchronously capture image after image in rapid succession, each image resulting in an additional synchronized set of frames in the plurality of synchronized sets of frames included in the dataset associated with positional configuration 400. If each synchronized set of frames provides an additional 25 data points (i.e., 25 3D locations of 25 features 602), a large number of data points associated with a significant percentage of all the pixels of the particular capture device distributed across all parts of the lens may be captured as operator 700 moves calibration object 500 around in front of formation 404 so as to position features 602 to be captured by all parts of the lens of the capture device in the center position (i.e., capture device 402-1 in the example of positional configuration 400).

This technique of moving the calibration object in front of the formation of capture devices so as to be repeatedly sampled to cover a large number of pixels distributed across a lens of a capture device in the center position of the formation may be referred to herein as a "dense sampling technique." Thus, FIG. 8 illustrates a dense sampling technique example where a capture area 800 of a particular capture device that is served by a lens of the capture device is marked with various 'X'-shaped samples 802 representing each pixel within capture area 800 that has been used to sample a feature 602 of calibration object 500 in at least one synchronized sets of frames. As shown, operator 700 may have moved calibration object 500 around while capture devices 402 repeatedly captured samples associated with the 25 features 602 until a large number of samples 802 densely cover pixels in all parts (e.g., in the center, in the corners, along the edges, etc.) of capture area 800.

As mentioned above, using a dense sampling technique may facilitate system 100 in determining accurate intrinsic parameter values for the particular capture device because all parts of the lens being characterized to generate the intrinsic parameter values may be fully and thoroughly characterized. Additionally, the dense sampling technique may promote accurate intrinsic parameter values for other reasons. For example, slight errors in individual samples (e.g., determinations of 3D locations of features 602) introduced by measuring limitations, residual uncertainty in depth measurements, and so forth may be distributed along a normal curve and, as such, may be referred to as Gaussian noise. By averaging the error of a large number of individually determined samples following this distribution, the Gaussian noise may be significantly reduced such that the average error of the samples goes to zero (i.e., is practically eliminated), thus making intrinsic calibration of the particular capture device more accurate.

As described above, a dense sampling technique may be performed when operator 700 moves calibration object 500 around so as to be densely captured by all parts of a lens of a capture device set up at the center position of formation 404. While each of the capture devices set up at the peripheral positions are configured to synchronously capture frames depicting calibration object 500 as operator 700 moves it in this fashion, however, it is noted that operator 700 may not intentionally attempt to achieve a similarly dense sampling pattern across all parts of the lenses of these peripheral capture devices as he or she does with all parts of the lens of the center capture device. This is, in part, because each capture device including the capture devices currently set up at the peripheral positions (e.g., capture devices 402-2 through 402-4 in positional configuration 400) will be progressively relocated around to all the positions including the center position of formation 400. Accordingly, each of capture devices 402 will be subject to dense sampling for a particular dataset (e.g., a particular plurality of synchronized sets of frames) when the capture device is relocated to have its turn set up at the center position.

Figure 9:
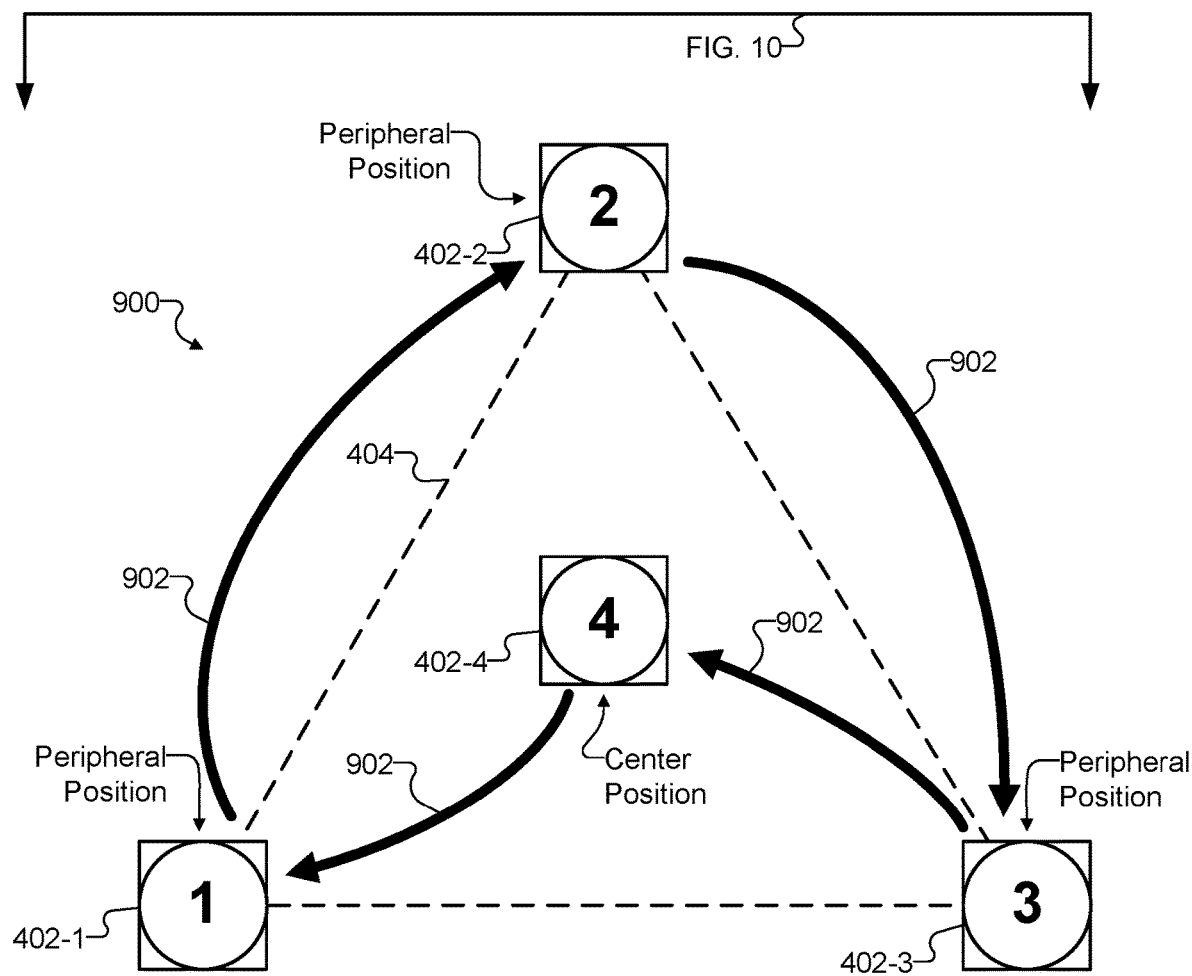
FIG. 9 illustrates a front view of an exemplary positional configuration formed when the set of capture devices are relocated from the positional configuration of FIG. 4 according to principles described herein.

To illustrate this progressive relocation of capture devices 402 in formation 400, FIG. 9 shows a front view of an exemplary positional configuration 900 formed when the set of capture devices 402 is relocated from forming positional configuration 400 according to a relocation pattern 902. Specifically, as shown, formation 404 may remain the same for positional configuration 900 as described above in relation to positional configuration 400 with one center position and three peripheral positions around the center position. However, each capture device 402 may be relocated from one position to another position in accordance with relocation pattern 902. Specifically, as shown, whereas capture device 402-1 was set up in the center position in positional configuration 400, capture device 402-1 has been relocated to a peripheral position in positional configuration 900. Similarly, as shown by the arrows indicating relocation pattern 902, capture devices 402-2 and 402-3 have been relocated to new peripheral positions of formation 404 in positional configuration 900 that are different from their previous peripheral positions in positional configuration 400. Finally, while capture device 402-4 was previously set up at a peripheral position of formation 404 in positional configuration 400, capture device 402-4 is now shown to be set up at the center position of formation 404 in positional configuration 900.

The progressive relocation of capture devices to form the four different positional configurations that are possible using relocation pattern 902 (i.e., positional configurations 400 and 900, as well as two other positional configurations not explicitly shown where capture devices 402-3 and 402-2 each are set up in the center position) may be performed in any suitable manner. For example, the set of capture devices 402 may be progressively relocated to form the plurality of different positional configurations by an operator overseeing calibration of the set of capture devices (e.g., operator 700). As such, it will be understood that, while capture devices 402 may be fixed in place (e.g., by way of tripods or other such fixtures) for each particular positional configuration, there may be slight differences in the precise locations of the positions of formation 404 from positional configuration to positional configuration (e.g., due to a tripod being slightly moved as the operator releases one capture device 402 from a particular position and/or installs a different capture device 402 at the particular position, etc.).

While certain aspects described previously (e.g., system 100, communication links 406, etc.) are not explicitly illustrated in conjunction with positional configuration 900 in FIG. 9 for the sake of simplicity, it will be understood that such aspects may be included with positional configuration 900 just as they were described for positional configuration 400 above. Additionally, while relocation pattern 902 is illustrated as one exemplary pattern in which capture devices 402 may be relocated, it will be understood that any suitable relocation pattern or combination of relocation patterns may be used as may serve a particular implementation.

Different positional configurations such as configurations 400 and 900 have been illustrated and described as examples of configurations of capture devices from which individual datasets (i.e., including individual pluralities of synchronized sets of frames) may be captured. In other words, different positional configurations where different capture devices 402 are centered in the formation (e.g., so as to have a straight-on view of calibration object 500 which is moved about in front of the center position in accordance with a dense sampling technique) may each provide different datasets which, when analyzed together by system 100, may allow for the determination of accurate and precise sets of intrinsic parameter values. In certain examples, the capture devices may additionally be set up in other types of positional configurations (e.g., by modifying other aspects of the configurations besides which capture device is in which position, as described above) to provide additional datasets to further improve the quality of the intrinsic parameter values that system 100 may determine for the capture devices.

Figure 10:
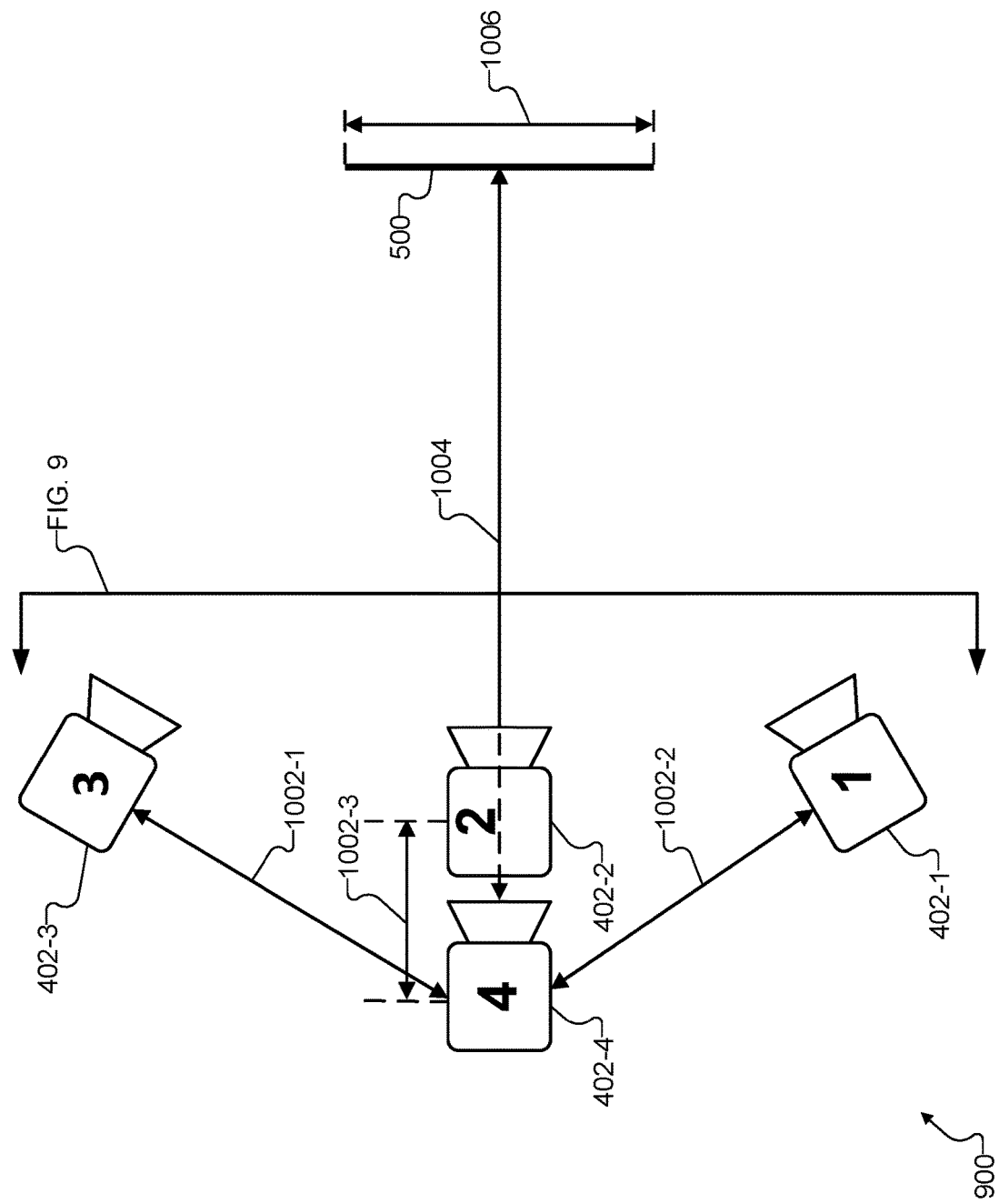
FIG. 10 illustrates a top view of the exemplary positional configuration of FIG. 9 along with the calibration object positioned in front of the formation implemented by the positional configuration according to principles described herein.

For example, FIG. 10 illustrates a top view of positional configuration 900 along with calibration object 500 positioned in front of the formation implemented by positional configuration 900. However, in FIG. 10, various distances between different capture devices 402, as well as a size of calibration object 500, are labeled to indicate that positional configuration 900 may be modified (e.g., converted to another distinct positional configuration) by altering one or more of these distances and/or the size of the calibration object. Specifically, as shown, each of the peripheral capture devices 402 (i.e., capture devices 402-1 through 402-3 in the example of positional configuration 900) may be separated from the center capture device 402 (i.e., capture device 402-4 in positional configuration 900) by a respective distance 1002 (i.e., distances 1002-1 through 1002-3). In some examples, one or more of distances 1002 may be equal or approximately equal, while in other examples, distances 1002 may be different from one another as may serve a particular implementation. Also shown in FIG. 10, calibration object 500 may be a distance 1004 from the center capture device 402 and may have a size 1006.

Positional configuration 900 (as well as each of the other positional configurations made possible by relocating capture devices 402 in accordance with relocation pattern 902) may be converted to form additional positional configurations by modifying formation 404 to increase or decrease distance 1002, distance 1004, and/or size 1006. For example, by increasing distances 1002 (i.e., enlarging the triangle formed by the peripheral positions of formation 404) and increasing distance 1004 (e.g., having operator 700 stand farther away from the capture devices with a calibration object 500 having a larger size 1006), the frames captured by capture devices 400 may yield new and additional information about the intrinsic characteristics of capture devices 402 (e.g., the lens distortions of the capture devices, etc.) that may facilitate system 100 in determining accurate and precise sets of intrinsic parameter values for capture devices 402.

Accordingly, in addition to accessing and processing the plurality of datasets (e.g., the four datasets) associated with the different positional configurations formed by relocating capture devices to different positions in a formation, system 100 may further access an additional plurality of datasets (e.g., four additional datasets) captured by the set of capture devices that is further progressively relocated to form an additional plurality of different positional configurations each implementing an additional formation. For example, the additional formation implemented by the additional plurality of different positional configurations may be an enlarged or expanded formation that includes the center position and one or more peripheral positions around the center position that are at a distance 1002 from the center position different from (e.g., greater than) a distance of the one or more peripheral positions in the original formation.

As with the datasets described above, each dataset in this additional plurality of datasets may include a respective plurality of synchronized sets of frames captured by the set of capture devices while the set of capture devices is set up in a respective positional configuration within the additional plurality of different positional configurations. Additionally, as described above, based on the accessed additional datasets, system 100 may determine 3D locations of features of a different (e.g., larger) calibration object positioned in front of the additional (e.g., enlarged) formation. For example, each 3D location may be determined based on different representations of the additional calibration object from different view angles associated with the center position and the one or more additional peripheral positions within the additional formation.

Accordingly, system 100 may determine the set of intrinsic parameter values for the particular capture device and/or the other capture devices in the set of capture devices further based on the determined 3D locations of the features of the additional calibration object. For instance, in the specific example described above with capture devices 402, system 100 may determine respective sets of intrinsic parameter values for each of capture devices 402 based on a total of eight datasets (e.g., using a standard and an extended-length formation described in relation to FIG. 10 for each of the four relocation possibilities described above in relation to FIG. 9). In other examples, system 100 may determine the sets of intrinsic parameter values based on other suitable numbers of datasets (e.g., using multiple formations of various lengths, using various relocation combinations, etc.).

As mentioned above, sets of intrinsic parameter values associated with particular capture devices and sets of extrinsic parameter values associated with the relative positions at which such capture devices are set up in a configuration may be determined based on a plurality of datasets accessed by system 100. For example, the datasets may include respective pluralities of synchronized sets of frames captured when the capture devices are set up in different configurations such as a plurality of calibration configurations used to determine accurate intrinsic parameter values and a volumetric capture configuration for which it may be desirable to determine extrinsic parameter values and then to capture a capture zone. Respective sets of intrinsic parameter values and extrinsic parameter values may be determined based on the plurality of datasets in any way as may serve a particular implementation. For instance, exemplary mathematical models and frameworks for capturing and analyzing the datasets to determine the intrinsic and extrinsic parameter values will now be described.

In order for frames captured from different capture devices having different perspectives to properly align using volumetric alignment techniques, it may be desirable, in certain examples, for the frames to be captured by capture devices that are intrinsically calibrated in accordance with a pinhole camera model. A capture device calibrated in accordance with the pinhole camera model may be thought of as an ideal capture device with no lens distortion. To illustrate, FIG. 11 shows exemplary aspects of a pinhole camera model that may be used by capture device calibration methods and systems described herein.

Figure 11:
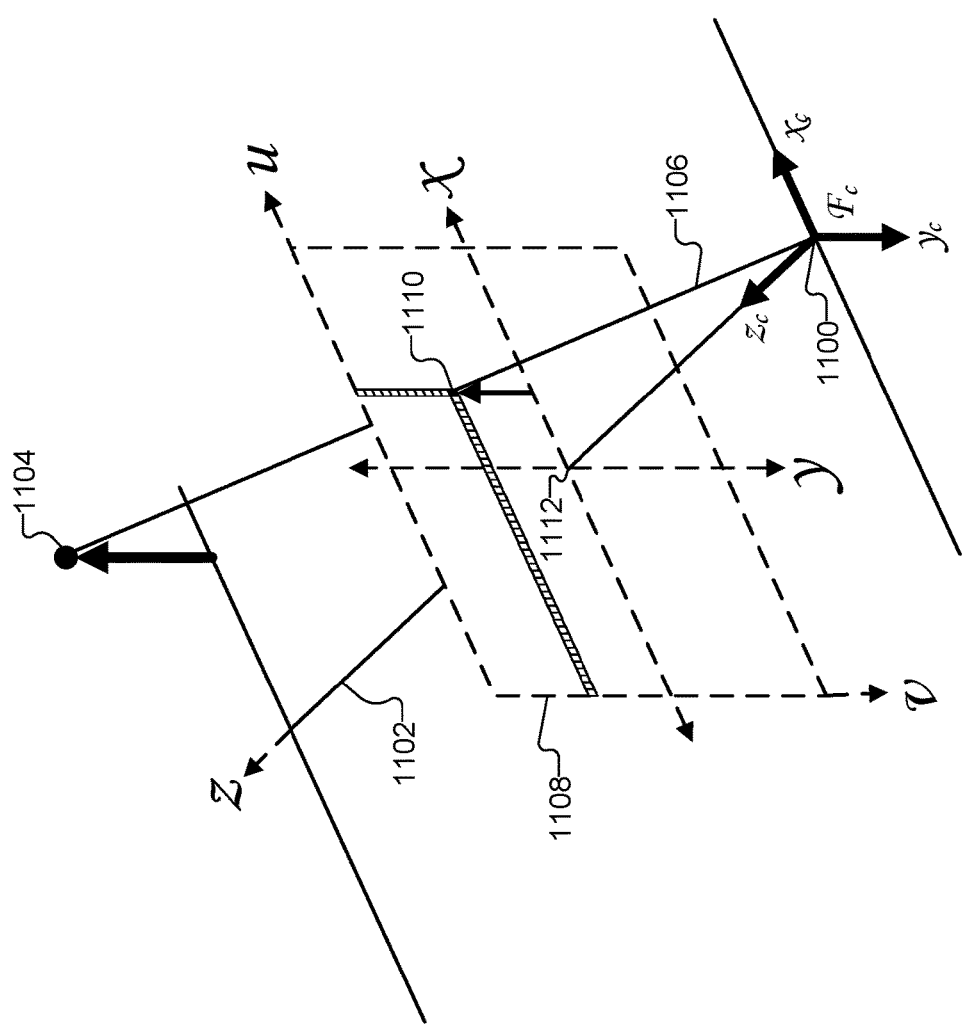
FIG. 11 illustrates exemplary aspects of a pinhole camera model used by capture device calibration methods and systems described herein according to principles described herein.

In FIG. 11, light reflected from objects in a scene may be captured at a capture point 1100 disposed on an optical axis 1102. For example, as shown, light reflected from a particular 3D point 1104 included in a scene may travel to capture point 1100 along a path 1106 such that a scene view may be formed by projecting 3D point 1104 (e.g., as well as other 3D points in the scene) onto an image plane 1108 using a perspective transformation. Specifically, as illustrated, a projection point 1110 (also referred to as a pixel 1110) representative of 3D point 1104 may be projected on image plane 1108 at a certain location within image plane 1108 correlating to path 1106 from the scene to capture point 1100. Mathematically, the pinhole model illustrated in FIG. 11 may be represented by the following equation:

$$s\ m' = A[R|t]M' \quad \text{(Equation 1)}$$

Equivalently, in a longer form, Equation 1 may be stated as:

$$s \begin{bmatrix} u \\ v \\ 1 \end{bmatrix} = \begin{bmatrix} f_x & 0 & c_x \\ 0 & f_y & c_y \\ 0 & 0 & 1 \end{bmatrix} \begin{bmatrix} r_{11} & r_{12} & r_{13} & t_1 \\ r_{21} & r_{22} & r_{23} & t_2 \\ r_{31} & r_{32} & r_{33} & t_3 \end{bmatrix} \begin{bmatrix} X \\ Y \\ Z \\ 1 \end{bmatrix} \quad \text{(Equation 2)}$$

The variables in Equations 1 and 2 may be characterized as follows:

s may be a scale factor (e.g., a constant) used to adjust projected images from a world scale (i.e., a scale associated with a global coordinate system) to an image scale suitable for a particular image.

m' or (u, v) may be the coordinates of projection point 1110 in pixels on image plane 1108. For instance, as shown in FIG. 11, projection point may be about 50 pixels to the right along the u axis and about 10 pixels down along the v axis, making (u, v) equal to (50, 10) in one example.

Matrix A may be a capture device matrix or, in other words, a matrix of intrinsic parameters. For example, intrinsic parameters included within matrix A may include $c_x$ and $c_y$, which may represent a principle point 1112 of an image sensor of a particular capture device, as well as $f_x$ and $f_y$, which may represent focal lengths expressed in pixel units.

Matrix [R|t] may be a rotation and translation matrix that transforms points in world coordinates into a capture device coordinate space. In other words, for example, the variable included in matrix [R|t] may be associated with a set of extrinsic parameters for a capture device modeled to be capturing an image at capture point 1100 with respect to a global coordinate system that is shared by other capture devices at other capture points.

M' or (X, Y, Z) may be the coordinates of 3D point 1104 in the world coordinate space (i.e., a coordinate space associated with the scene in which 3D point 1104 resides and which is shared by other capture devices at other capture points).

Because actual capture devices are not able to capture light all at one point such as capture point 1100, the mathematical model used by system 100 may be configured to account for the fact that images captured by the capture devices during the calibration process may be equipped with lenses that direct light onto image sensors of the capture devices and, in doing so, create distortion in the projected lines (e.g., such as path 1106). In order for the pinhole camera model to be properly implemented, such distortion must be corrected. This correction may be performed in various suitable ways depending on characteristics of the distortion of the lens (e.g., a fisheye lens may use a different distortion correction model than a regular lens, etc.).

Figure 12C:
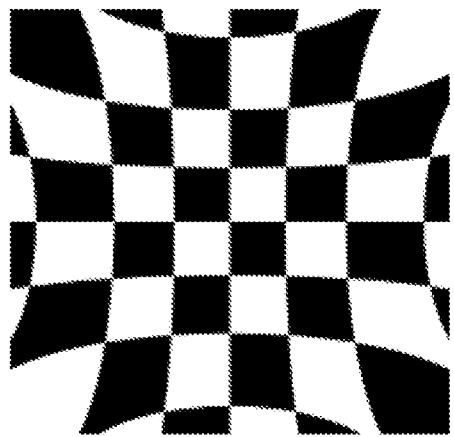
FIGS. 12A-12C illustrate how different types of lens distortion may affect an image capture of a checkerboard pattern according to principles described herein.
Figure 12B:
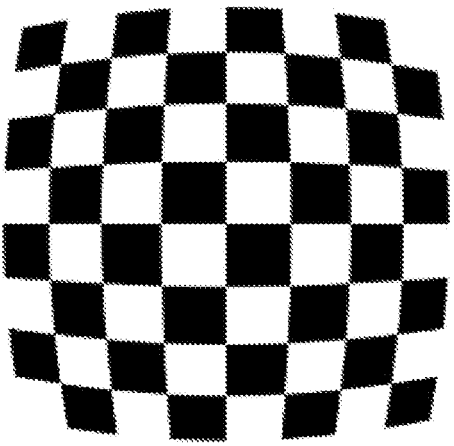
Figure 12A:
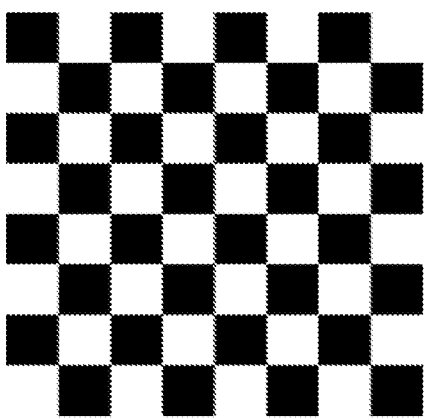

FIGS. 12A through 12C illustrate how different types of lens distortion may affect an image capture of a checkerboard pattern such as the checkerboard pattern on calibration object 500. Specifically, FIG. 12A illustrates an image capture of a checkerboard pattern in which no lens distortion is present. FIG. 12B illustrates an image capture of the same checkerboard pattern in which some amount of positive radial distortion (i.e., barrel distortion) is present. Conversely, FIG. 12C illustrates an image capture of the same checkerboard pattern in which some amount of negative radial distortion (i.e., pincushion distortion) is present. In addition to radial distortion illustrated in FIGS. 12B and 12C, it will be understood that, in many examples, lenses may also have some amount of tangential distortion and/or other types of distortion not explicitly illustrated. Regardless, the pinhole camera model described above may be extended in any suitable way to account for any of various types of lens distortion that may be present in a lens of a particular capture device. An exemplary mathematical model for intrinsic and extrinsic calibration (i.e., determination of intrinsic and/or extrinsic parameter values) based on the pinhole camera projection model and distortion models described above will be described below.

As illustrated and described above, a set of capture devices may be progressively relocated to form various positional configurations so as to capture a plurality of datasets used to determine intrinsic parameter values for one or more of the capture devices. For example, the determining of the set of intrinsic parameter values for the particular capture device may include setting up an overdetermined system of equations representative of one or more sets of intrinsic parameters for the capture devices and performing an optimization with respect to the overdetermined system of equations to calculate the one or more sets of intrinsic parameter values for the capture devices.

As used herein, an "overdetermined system of equations" may refer to a system of equations in which there are more equations describing a set of unknowns than there are unknowns. For example, a large number (e.g., thousands, millions, etc.) of 3D locations determined based on a large number of synchronized sets of frames in a plurality of datasets (e.g., four datasets or eight datasets in certain specific examples described above) may be captured by a set of capture devices and accessed by system 100. This data may be sufficient to allow system 100 to set up a large number of equations (e.g., equations based on the determined 3D locations of the features of the calibration object) describing a relatively small number of intrinsic and/or extrinsic parameters for the capture devices.

Because the positional configurations used for calibrating capture devices may not be of particular use in volumetric capture applications (e.g., capturing objects within a capture zone of a real-world scene from which to generate virtual reality media content), only the intrinsic parameter values determined based on datasets captured by capture devices in such calibration configurations may be used. For example, while extrinsic parameter values may also be determined as part of the mathematical process, these extrinsic parameter values may be disregarded because they relate only to calibration configurations and not capture configurations. Once intrinsic parameter values have been determined using the calibration configurations, however, the capture devices may be set up in a different positional configuration, referred to herein as a volumetric capture configuration, so that accurate and useful extrinsic parameter values may be derived based on the intrinsic parameter values of the capture devices that have now been intrinsically calibrated.

To this end, after determining the intrinsic parameter values for the capture devices, system 100 may set up an overdetermined system of equations that is similar to, but separate from, the system of equations used to determine the intrinsic parameter values during the intrinsic calibration. Specifically, as with the previous overdetermined system of equations, this additional overdetermined system of equations may be representative of one or more sets of intrinsic parameters and extrinsic parameters for the capture devices, and may include equations that are based on 3D locations of the features of the calibration object. However, unlike the previous system of equations, which was based on 3D locations of the features while the calibration object was positioned in front of calibration configuration such as shown in FIG. 5, the additional system of equations may be based on 3D locations of features determined using the set of capture devices while the set of capture devices is set up in a volumetric capture configuration. Accordingly, system 100 may determine one or more sets of extrinsic parameter values by fixing variables, within the additional overdetermined system of equations, that correspond to the set of intrinsic parameters to be equal to values corresponding to the determined set of intrinsic parameter values. In other words, the intrinsic parameter values that have already been determined using the calibration configurations may be locked down (i.e., used as constants, rather than variables) for use in the additional overdetermined system of equations associated with the volumetric capture configuration. With the variables that correspond to the set of intrinsic parameters fixed to the values corresponding to the determined set of intrinsic parameter values, system 100 may perform an optimization with respect to the additional overdetermined system of equations to calculate the one or more sets of extrinsic parameter values for the capture devices in the volumetric capture configuration.

Figure 13B:
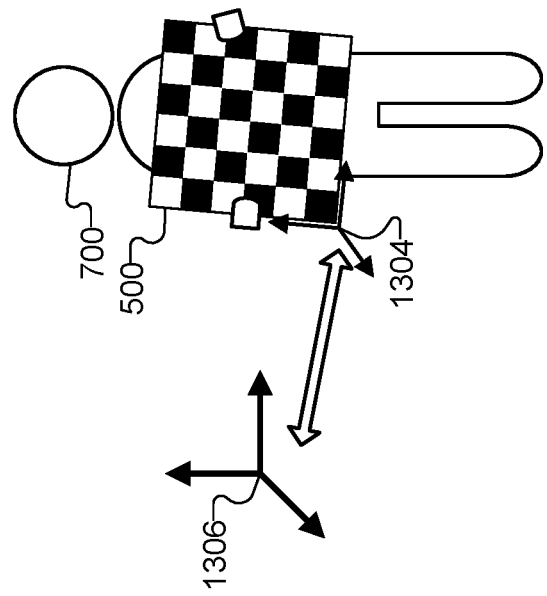
FIG. 13B illustrates an exemplary transformation between an exemplary local coordinate system and a global coordinate system according to principles described herein.
Figure 13A:
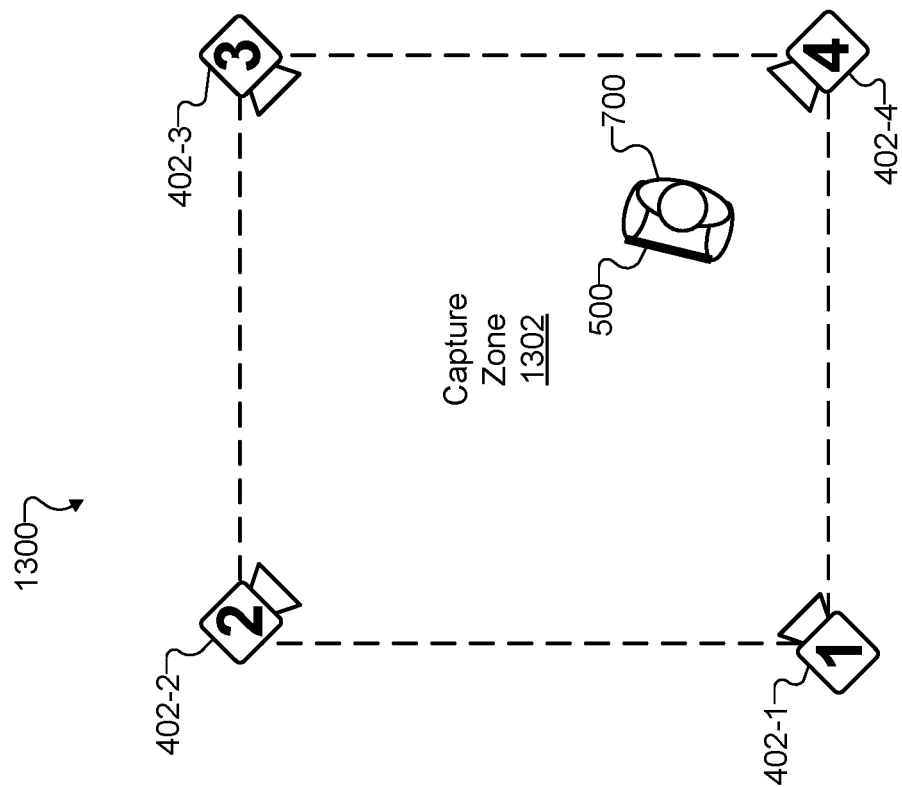
FIG. 13A illustrates the set of capture devices set up in an exemplary volumetric capture configuration with respect to an exemplary capture zone according to principles described herein.

To illustrate how extrinsic calibration of the set of capture devices may be performed based on intrinsic calibration that has been performed previously, FIG. 13A shows the set of capture devices 402 set up in an exemplary volumetric capture configuration 1300 with respect to an exemplary capture zone 1302. As shown, to extrinsically calibrate capture devices 402 with respect to volumetric capture configuration 1300, operator 700 may hold calibration object 500 to be seen by multiple capture devices 402 at once and may move around within capture zone 1302 to allow the set of capture devices 402 to capture synchronized sets of frames to form a dataset in a similar manner as described above for the intrinsic calibration.

As intrinsic calibration may have already taken place when the extrinsic calibration is performed, it may not be necessary to capture synchronized sets of frames in accordance with a dense capture technique. Instead, the aim of operator 700 as he or she moves calibration object 500 around within capture zone 1302 may be to ensure that each of capture devices 402 captures frames that will overlap with frames captured by at least one other capture device 402. In this way, extrinsic parameter values may be based on transformations from local coordinate systems associated with each capture device 402 to a single global coordinate system, rather than by, for example, a potentially error-multiplying technique of coordinating local coordinate systems to one another in a progressive, daisy-chain technique.

While volumetric capture configuration 1300 is shown to include only the same four capture devices 402 described as being intrinsically calibrated above, it will be understood that any number of capture devices that have been intrinsically calibrated in the manner described above (e.g., whether or not all of the capture devices were calibrated together as part of the same calibration configurations) may be used in volumetric capture configuration 1300.

FIG. 13B illustrates an exemplary transformation between an exemplary local coordinate system 1304 and a global coordinate system 1306. For example, as described in relation to FIG. 13A, operator 700 may present calibration object 500 to one or more of capture devices 402 so that features 602 of calibration object 500 may be transformed (e.g., rotated, translated, etc.) from local coordinate system 1304 (e.g., a calibration object model coordinate system) to global coordinate system 1306. In certain examples, this transformation may be described by the following equation:

$$M'_{nc} = f(\omega, \varphi, k, t) * M^\Lambda{}_{nc} \quad \text{(Equation 3)}$$

The variables and subscripts in Equation 3 may be characterized as follows:

M' may refer to a 3D position of a particular feature 602 of calibration object 500 with respect to global coordinate system 1306.

$f(\omega, \varphi, k, t)$ may refer to a rotation and translation transformation function. Specifically, the rotation of the particular feature 602 may be represented using Euler angles ω, φ, and k that define a sequence of three elementary rotations around an x-axis, a y-axis, and a z-axis, respectively. In other examples, this transformation may be represented in another suitable format (e.g., Matrix, quaternion, etc.).

$M^\Lambda$ may refer to the 3D location of the particular feature 602 of calibration object 500 with respect to local coordinate system 1304. For example, the checkerboard calibration pattern may include features laid out on an x-y plane starting at (0, 0) in a starting corner of local coordinate space 1304 such that each feature 602 has an (x, y) coordinate that corresponds to a physical measurement of distance (e.g., in millimeters) from the starting corner.

nc (subscript) may represent an index for the particular feature 602 (e.g., checkerboard corner) of calibration object 500. For example, as illustrated in FIG. 6, calibration object 500 may include 25 features 602 that may be indexed as nc=1 to nc=25.

Combining Equations 1 through 3, and taking into account the data capture process described herein, the following equation may be derived to describe the relationship between captured data, intrinsic parameters, and extrinsic parameters:

$$s\, m''_{nd,nf,ns,nc} = A_{ns} * [R|t]_{nd,ns} * f(\omega,\varphi,k,t)_{nd,nf} * M^\Lambda_{nc} * f(K1\ldots P1\ldots)_{ns} \quad \text{(Equation 4)}$$

The variables and subscripts in Equation 4 may be characterized as follows:

nd (subscript) may represent an index of a particular dataset from the plurality of datasets that system 100 accesses, or, in other words, may represent an index of a particular positional configuration (e.g., either an intrinsic calibration configuration or a volumetric capture configuration) in which the set of capture devices 402 may be set up. For example, for intrinsic calibration of four capture devices 402 that are progressively relocated to each position of a formation (e.g., as shown in FIG. 9) for two different formation sizes at each position (e.g., as shown in FIG. 10), nd may be set to an index between 1 and 8.

nf (subscript) may represent an index of a particular synchronized set of frames within a particular dataset. For example, if a particular dataset includes 1000 synchronized sets of frames, nf may be set to an index between 1 and 1000.

ns (subscript) may represent an index of a particular capture device (e.g., with the corresponding lens and sensor of the capture device). Thus, for instance, if a particular configuration includes four capture devices (e.g., such as capture devices 402-1 through 402-4), ns may be set to an index between 1 and 4.

nc (subscript) may represent an index for a particular feature 602 of a calibration object 500, as described above.

s may represent a scale factor, as described above.

$M''_{nd,nf,ns,nc}$ may represent pixel coordinates of a projection of calibration feature $M^\Lambda_{nc}$ onto an image plane (e.g., such as image plane 1108) of an image sensor of a capture device having index ns, for a synchronized set of frames having index nf within a dataset nd.

Matrix $A_{ns}$ may represent a capture device matrix, such as described above in relation to Equations 1 and 2, that corresponds to the capture device having index ns.

Matrix $[R|t]_{nd,ns}$ may represent a rotation and translation matrix such as described above in relation to Equations 1 and 2 for a coordinate location and orientation (i.e., pose) with respect to global coordinate system 1306 of the image sensor of the capture device having index ns for a dataset nd.

$f(\omega, \varphi, k, t)_{nd,nf}$ may refer to a rotation and translation transformation function, such as described above in relation to Equation 3, for a synchronized set of frames nf within dataset nd. Because the transformation is with respect to global coordinate system 1306, the orientation or pose of calibration object 500 may be the same regardless of which capture device 402 observes it. As such, indices for ns and nc are not used for this transformation function.

$M^\Lambda_{nc}$ may refer to the 3D location of a particular feature 602 having index nc with respect to local coordinate system 1304, as described above. Because all datasets (nd), synchronized sets of frames (nf), and capture devices devices (ns) view the same features 602 of calibration object 500, indices for nd, nf, and ns are not used for this variable.

$f(K1\ldots P1\ldots)_{ns}$ may represent a distortion correction function for correcting lens distortion of a lens of a capture device having index ns, as described above in relation to FIG. 12.

System 100 may use Equation 4 to set up (e.g., using various combinations of indices) an overdetermined system of equations based on the data accessed in the plurality of datasets and/or other data available to system 100. For example, if the datasets are associated with calibration configurations, the overdetermined system of equations may be used to determine intrinsic parameter values, while extrinsic parameter values determined may be disregarded. Conversely, if the datasets are associated with a volumetric capture configuration, the overdetermined system of equations may be set up with intrinsic parameters already fixed (i.e., set as constant values that have been previously determined in an intrinsic calibration of the capture devices) so that extrinsic parameter values may be determined.

To this end, as described above, system 100 may perform an optimization with respect to the overdetermined system of equations set up based on Equation 4 and the respective datasets that have been accessed. This optimization may be performed in any suitable manner. For example, system 100 may perform a least squares optimization with respect to the overdetermined system of equations by using the following equation:

$$\Sigma_{i=0}^{nd,nf,ns,nc}(y_{nd,nf,ns,nc} - m''_{nd,nf,ns,nc})^2 \quad \text{(Equation 5)}$$

The variables and subscripts in Equation 5 may be characterized as follows:

$m''_{nd,nf,ns,nc}$ may represent the pixel ocordinates of the projection of calibration features, as described above in relation to Equation 4.

$y_{nd,nf,ns,nc}$ may represent measured pixel coordinates of features 602 of calibration object 500 in images accessed by system 100 from the various datasets in the plurality of datasets. For example, measured coordinates may be obtained using a checkerboard corner locating algorithm for calibration object 500.

System 100 may perform the least squares optimization of Equation 5 in any manner as may serve a particular implementation. For example, conventional least squares problem solving approaches such as the Gauss-Newton algorithm, the Levenberg-Marquardt algorithm, or another suitable approach may be employed.

Figure 14:
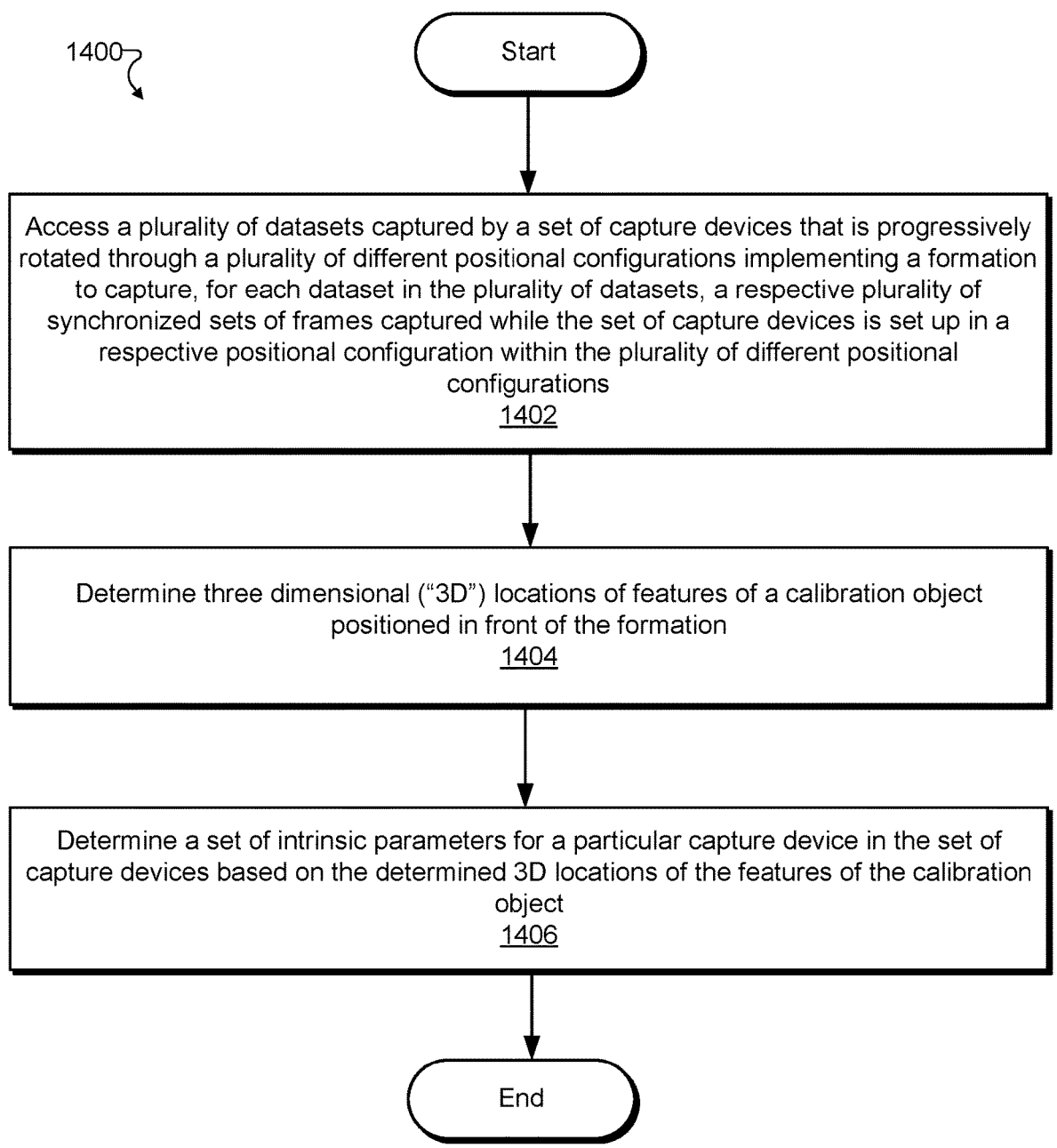
FIG. 14 illustrates an exemplary capture device calibration method according to principles described herein.

FIG. 14 illustrates an exemplary capture device calibration method 1400. While FIG. 14 illustrates exemplary operations according to one embodiment, other embodiments may omit, add to, reorder, and/or modify any of the operations shown in FIG. 14. One or more of the operations shown in FIG. 14 may be performed by system 100, any components included therein (e.g., capture devices included therein), and/or any implementation thereof.

In operation 1402, a capture device calibration system may access a plurality of datasets captured by a set of capture devices. The capture devices in the plurality of capture devices may be progressively relocated to form a plurality of different positional configurations each implementing a formation that includes a center position and one or more peripheral positions around the center position. Thus, each dataset in the plurality of datasets may including a respective plurality of synchronized sets of frames captured by the set of capture devices while the set of capture devices is set up in a respective positional configuration within the plurality of different positional configurations. For example, the plurality of different positional configurations may include a first positional configuration in which a particular capture device included in the set of capture devices is set up at the center position, and one or more other positional configurations in which the particular capture device is set up at the one or more peripheral positions around the center position. Operation 1402 may be performed in any of the ways described herein.

In operation 1404, the capture device calibration system may determine 3D locations of features of a calibration object positioned in front of the formation. For example, each 3D location may be determined based on different representations of the calibration object from different view angles associated with the center position and the one or more peripheral positions within the formation. In some examples, the different representations used to determine the 3D locations may be depicted by frames included in a first synchronized set of frames captured while the set of capture devices is set up in the first positional configuration and may be further depicted by frames included in one or more other synchronized sets of frames captured while the set of capture devices is set up in the one or more other positional configurations. Operation 1404 may be performed in any of the ways described herein.

In operation 1406, the capture device calibration system may determine a set of intrinsic parameter values for the particular capture device based on the 3D locations of the features of the calibration object determined in operation 1404. Operation 1406 may be performed in any of the ways described herein.

Figure 15:
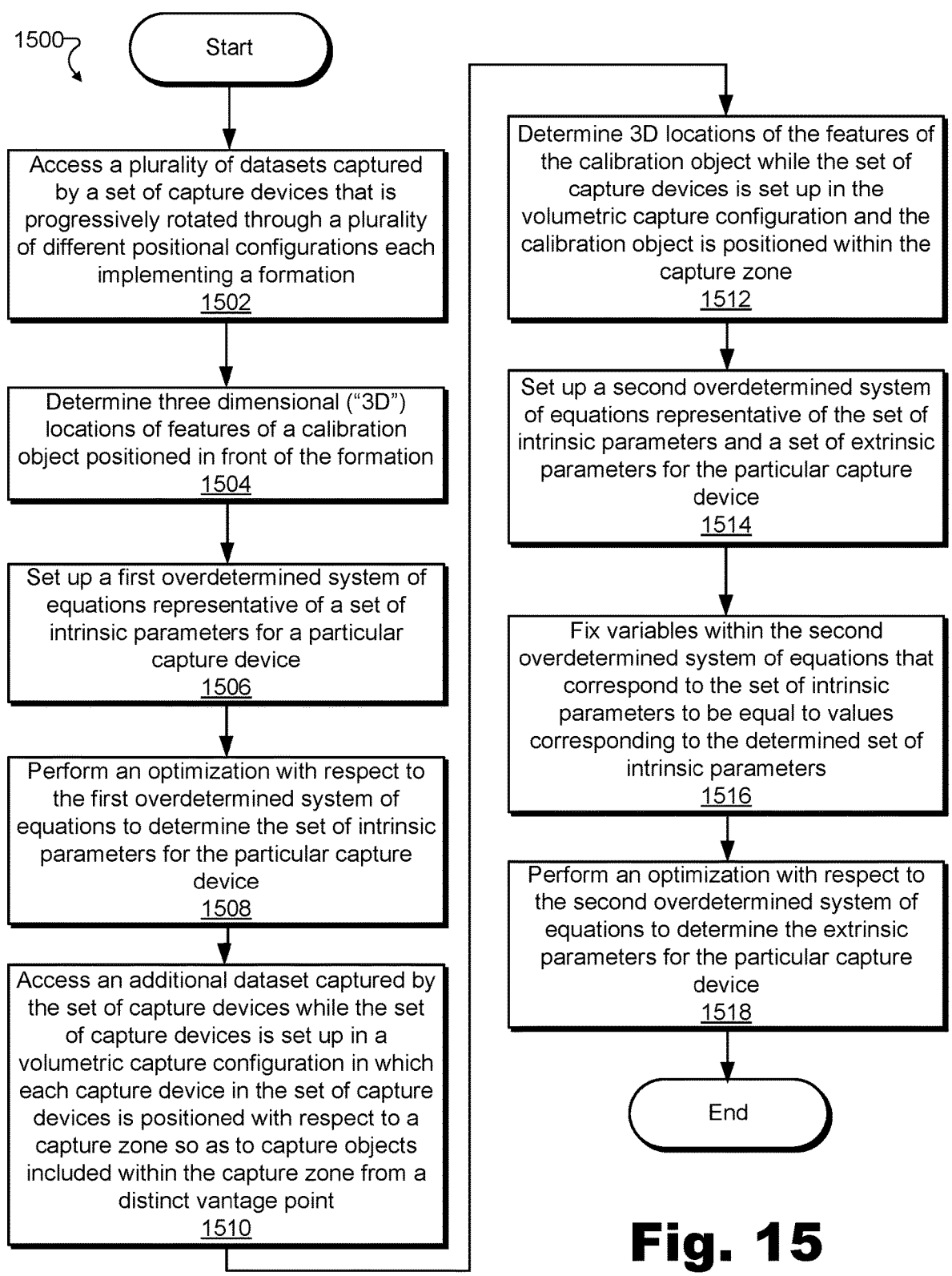
FIG. 15 illustrates another exemplary capture device calibration method according to principles described herein.

FIG. 15 illustrates an exemplary capture device calibration method 1500. While FIG. 15 illustrates exemplary operations according to one embodiment, other embodiments may omit, add to, reorder, and/or modify any of the operations shown in FIG. 15. One or more of the operations shown in FIG. 15 may be performed by system 100, any components included therein (e.g., capture devices included therein), and/or any implementation thereof.

In operation 1502, a capture device calibration system may access a plurality of datasets captured by a set of capture devices. For example, the capture devices in the set of capture devices may be progressively relocated to form a plurality of different positional configurations each implementing a formation that includes a center position and one or more peripheral positions around the center position. Operation 1502 may be performed in any of the ways described herein.

In operation 1504, the capture device calibration system may determine 3D locations of features of a calibration object positioned in front of the formation. For example, each 3D location may be determined based on different representations of the calibration object from different view angles associated with the center position and the one or more peripheral positions within the formation. Operation 1504 may be performed in any of the ways described herein.

In operation 1506, the capture device calibration system may set up a first overdetermined system of equations representative of a set of intrinsic parameters for a particular capture device. For example, the equations in the first overdetermined system of equations may be based on the 3D locations of the features of the calibration object positioned in front of the formation that are determined in operation 1504. Operation 1506 may be performed in any of the ways described herein.

In operation 1508, the capture device calibration system may perform an optimization with respect to the first overdetermined system of equations set up in operation 1506 to determine the set of intrinsic parameter values for the particular capture device. Operation 1508 may be performed in any of the ways described herein.

In operation 1510, the capture device calibration system may access an additional dataset captured by the set of capture devices. For example, the additional dataset may be captured by the set of capture devices while the set of capture devices is set up in a volumetric capture configuration in which each capture device in the set of capture devices is positioned with respect to a capture zone so as to capture objects included within the capture zone from a distinct vantage point. Operation 1510 may be performed in any of the ways described herein.

In operation 1512, the capture device calibration system may determine 3D locations of the features of the calibration object. For example, the 3D locations may be where the features of the calibration object are located while the set of capture devices is set up in the volumetric capture configuration and the calibration object is positioned within the capture zone. In some examples, each 3D location determined in operation 1512 may be based on different representations of the calibration object from different view angles associated with different locations in which the capture devices are positioned with respect to the capture zone in the volumetric capture configuration. Operation 1512 may be performed in any of the ways described herein.

In operation 1514, the capture device calibration system may set up a second overdetermined system of equations. The second overdetermined system of equations may be representative of the set of intrinsic parameters and a set of extrinsic parameters for the particular capture device. For example, the equations in the second overdetermined system of equations may be based on the 3D locations of the features of the calibration object determined using the set of capture devices while the set of capture devices is set up in the volumetric capture configuration. Operation 1514 may be performed in any of the ways described herein.

In operation 1516, the capture device calibration system may fix variables that correspond to the set of intrinsic parameters within the second overdetermined system of equations set up in operation 1514 to be equal to values corresponding to the set of intrinsic parameter values determined in operation 1508. Operation 1516 may be performed in any of the ways described herein.

In operation 1518, the capture device calibration system may perform an optimization with respect to the second overdetermined system of equations set up in operation 1514 to determine the extrinsic parameter values for the particular capture device. For example, the extrinsic parameter values may be for the particular capture device while the set of capture devices is set up in the volumetric capture configuration. In certain examples, the capture device calibration system may perform the optimization while the variables that correspond to the set of intrinsic parameters are fixed, in accordance with operation 1516, to the values corresponding to the set of intrinsic parameter values determined in operation 1508. Operation 1518 may be performed in any of the ways described herein.

In certain embodiments, one or more of the systems, components, and/or processes described herein may be implemented and/or performed by one or more appropriately configured computing devices. To this end, one or more of the systems and/or components described above may include or be implemented by any computer hardware and/or computer-implemented instructions (e.g., software) embodied on at least one non-transitory computer-readable medium configured to perform one or more of the processes described herein. In particular, system components may be implemented on one physical computing device or may be implemented on more than one physical computing device. Accordingly, system components may include any number of computing devices, and may employ any of a number of computer operating systems.

In certain embodiments, one or more of the processes described herein may be implemented at least in part as instructions embodied in a non-transitory computer-readable medium and executable by one or more computing devices. In general, a processor (e.g., a microprocessor) receives instructions, from a non-transitory computer-readable medium, (e.g., a memory, etc.), and executes those instructions, thereby performing one or more processes, including one or more of the processes described herein. Such instructions may be stored and/or transmitted using any of a variety of known computer-readable media.

A computer-readable medium (also referred to as a processor-readable medium) includes any non-transitory medium that participates in providing data (e.g., instructions) that may be read by a computer (e.g., by a processor of a computer). Such a medium may take many forms, including, but not limited to, non-volatile media, and/or volatile media. Non-volatile media may include, for example, optical or magnetic disks and other persistent memory. Volatile media may include, for example, dynamic random access memory ("DRAM"), which typically constitutes a main memory. Common forms of computer-readable media include, for example, a disk, hard disk, magnetic tape, any other magnetic medium, a compact disc read-only memory ("CD-ROM"), a digital video disc ("DVD"), any other optical medium, random access memory ("RAM"), programmable read-only memory ("PROM"), electrically erasable programmable read-only memory ("EPROM"), FLASH-EEPROM, any other memory chip or cartridge, or any other tangible medium from which a computer can read.

Figure 16:
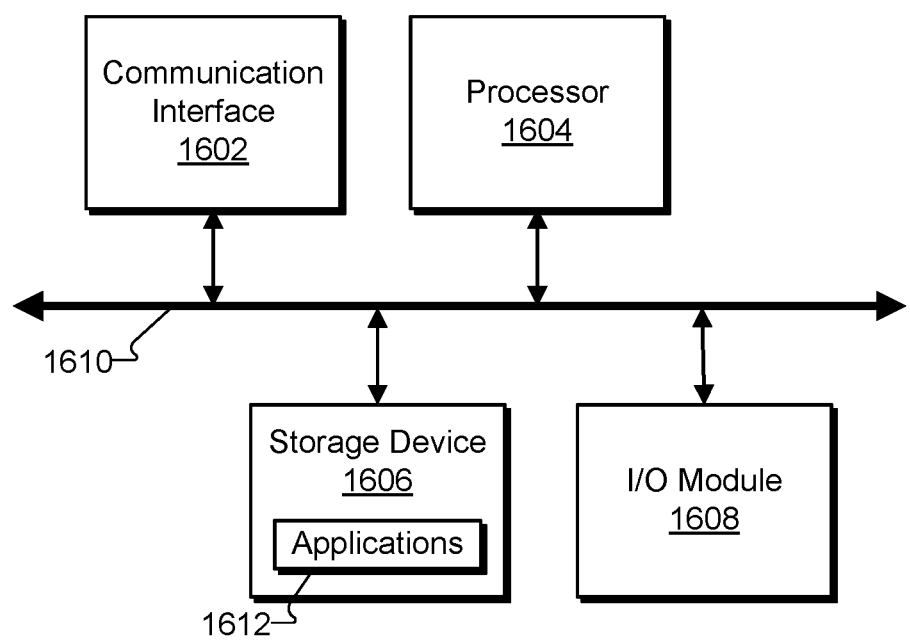
FIG. 16 illustrates an exemplary computing device according to principles described herein.

FIG. 16 illustrates an exemplary computing device 1600 that may be specifically configured to perform one or more of the processes described herein. As shown in FIG. 16, computing device 1600 may include a communication interface 1602, a processor 1604, a storage device 1606, and an input/output ("I/O") module 1608 communicatively connected via a communication infrastructure 1610. While an exemplary computing device 1600 is shown in FIG. 16, the components illustrated in FIG. 16 are not intended to be limiting. Additional or alternative components may be used in other embodiments. Components of computing device 1600 shown in FIG. 16 will now be described in additional detail.

Communication interface 1602 may be configured to communicate with one or more computing devices. Examples of communication interface 1602 include, without limitation, a wired network interface (such as a network interface card), a wireless network interface (such as a wireless network interface card), a modem, an audio/video connection, and any other suitable interface.

Processor 1604 generally represents any type or form of processing unit capable of processing data or interpreting, executing, and/or directing execution of one or more of the instructions, processes, and/or operations described herein. Processor 1604 may direct execution of operations in accordance with one or more applications 1612 or other computer-executable instructions such as may be stored in storage device 1606 or another computer-readable medium.

Storage device 1606 may include one or more data storage media, devices, or configurations and may employ any type, form, and combination of data storage media and/or device. For example, storage device 1606 may include, but is not limited to, a hard drive, network drive, flash drive, magnetic disc, optical disc, RAM, dynamic RAM, other non-volatile and/or volatile data storage units, or a combination or sub-combination thereof. Electronic data, including data described herein, may be temporarily and/or permanently stored in storage device 1606. For example, data representative of one or more executable applications 1612 configured to direct processor 1604 to perform any of the operations described herein may be stored within storage device 1606. In some examples, data may be arranged in one or more databases residing within storage device 1606.

I/O module 1608 may include one or more I/O modules configured to receive user input and provide user output. One or more I/O modules may be used to receive input for a single virtual reality experience. I/O module 1608 may include any hardware, firmware, software, or combination thereof supportive of input and output capabilities. For example, I/O module 1608 may include hardware and/or software for capturing user input, including, but not limited to, a keyboard or keypad, a touchscreen component (e.g., touchscreen display), a receiver (e.g., an RF or infrared receiver), motion sensors, and/or one or more input buttons.

I/O module 1608 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O module 1608 is configured to provide graphical data to a display for presentation to a user. The graphical data may be representative of one or more graphical user interfaces and/or any other graphical content as may serve a particular implementation.

In some examples, any of the facilities described herein may be implemented by or within one or more components of computing device 1600. For example, one or more applications 1612 residing within storage device 1606 may be configured to direct processor 1604 to perform one or more processes or functions associated with facilities 102 or 104 of system 100. Likewise, storage facility 106 of system 100 may be implemented by or within storage device 1606.

To the extent the aforementioned embodiments collect, store, and/or employ personal information provided by individuals, it should be understood that such information shall be used in accordance with all applicable laws concerning protection of personal information. Additionally, the collection, storage, and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

In the preceding description, various exemplary embodiments have been described with reference to the accompanying drawings. It will, however, be evident that various modifications and changes may be made thereto, and additional embodiments may be implemented, without departing from the scope of the invention as set forth in the claims that follow. For example, certain features of one embodiment described herein may be combined with or substituted for features of another embodiment described herein. The description and drawings are accordingly to be regarded in an illustrative rather than a restrictive sense.

The invention claimed is:

1. A method comprising:
    accessing, by a capture device calibration system, a first dataset captured by a set of capture devices while the capture devices are positioned in a first positional configuration of a plurality of different positional configurations, wherein:
        the plurality of different positional configurations each implement a formation including a center position and a plurality of peripheral positions around the center position,
        a particular capture device in the set of capture devices is positioned at the center position of the formation for the first positional configuration, and
        the first dataset includes a first synchronized set of frames captured by the set of capture devices while set up in the first positional configuration;
    accessing, by the capture device calibration system, a second dataset captured by the set of capture devices while the capture devices are positioned in a second positional configuration of the plurality of different positional configurations, wherein:
        the particular capture device is positioned at a particular peripheral position of the plurality of peripheral positions of the formation for the second positional configuration, and
        the second dataset includes a second synchronized set of frames captured by the set of capture devices while set up in the second positional configuration;
    determining, by the capture device calibration system, three dimensional ("3D") locations of features of a calibration object positioned in front of the formation, each 3D location determined based on different representations of the calibration object from different view angles associated with the center position and the particular peripheral position within the formation, the different representations depicted by frames included in the first synchronized set of frames and the second synchronized set of frames;
    determining, by the capture device calibration system, a set of intrinsic parameter values for the particular capture device based on the determined 3D locations of the features of the calibration object; and
    generating, for experiencing by a virtual reality user, virtual reality content representative of a real-world scene that is captured in part by the particular capture device as calibrated with the determined set of intrinsic parameters.

2. The method of claim 1, wherein the determining of the 3D locations of the features of the calibration object based on the different representations depicted by frames included in the first synchronized set of frames includes:
    determining, for each particular feature of the calibration object and based on a representation of the calibration object captured by the particular capture device when set up at the center position of the formation for the first positional configuration, a two dimensional ("2D") location of the particular feature with respect to a 2D plane oriented to be orthogonal with a viewing ray of the capture device set up at the center position of the formation; and
    determining, for each particular feature of the calibration object and based on one or more representations of the calibration object captured by additional capture devices of the set of capture devices that are set up at the plurality of peripheral positions of the formation, a depth of the particular feature with respect to the particular capture device set up at the center position.

3. The method of claim 1, wherein the determining of the 3D locations of the features of the calibration object is performed in accordance with a dense sampling technique in which representations of the calibration object are captured repeatedly until the features of the calibration object have been densely captured across all parts of a lens of the particular capture device.

4. The method of claim 1, wherein the formation includes four positions comprising the center position and three peripheral positions, the three peripheral positions forming vertices of a triangle that encloses the center position as viewed from a position of the calibration object in front of the formation.

5. The method of claim 1, wherein the calibration object comprises a checkerboard pattern and the features of the calibration object comprise points on the checkerboard pattern where a plurality of squares of the checkerboard pattern meet.

6. The method of claim 1, wherein the determining of the set of intrinsic parameter values for the particular capture device includes:
    setting up an overdetermined system of equations representative of a set of intrinsic parameters for the particular capture device, the equations in the overdetermined system of equations based on the determined 3D locations of the features of the calibration object; and
    performing an optimization with respect to the overdetermined system of equations to calculate the set of intrinsic parameter values for the particular capture device.

7. The method of claim 1, further comprising:
    setting up, by the capture device calibration system, an overdetermined system of equations representative of a set of intrinsic parameters and a set of extrinsic parameters for the particular capture device, the equations in the overdetermined system of equations based on 3D locations of the features of the calibration object determined using the set of capture devices while the set of capture devices is set up in a volumetric capture configuration; and
    determining, by the capture device calibration system, a set of extrinsic parameter values for the particular capture device by
        fixing variables, within the overdetermined system of equations, that correspond to the set of intrinsic parameters to be equal to values corresponding to the determined set of intrinsic parameter values, and
        performing, while the variables that correspond to the set of intrinsic parameters are fixed to the values corresponding to the determined set of intrinsic parameter values, an optimization with respect to the overdetermined system of equations to calculate the extrinsic parameter values for the particular capture device.

8. The method of claim 1, further comprising:

accessing, by the capture device calibration system, a third dataset captured by the set of capture devices while the capture devices are positioned in a third positional configuration of an additional plurality of different positional configurations, wherein:
- the additional plurality of different positional configurations each implement an additional formation that includes the center position and a plurality of additional peripheral positions around the center position at a distance from the center position different from a distance of the one or more peripheral positions in the formation,
- the third dataset includes a third synchronized set of frames captured by the set of capture devices while the set of capture devices is set up in the third positional configuration within the additional plurality of different positional configurations; and determining, by the capture device calibration system, 3D locations of features of an additional calibration object positioned in front of the additional formation, each 3D location determined based on different representations of the additional calibration object from different view angles associated with the center position and the one or more additional peripheral positions within the additional formation;

wherein the determining of the set of intrinsic parameter values for the particular capture device is further based on the determined 3D locations of the features of the additional calibration object.

9. The method of claim 1, wherein each of the capture devices in the set of capture devices is progressively relocated to the center position and to each of the plurality of peripheral positions to form the plurality of different positional configurations.

10. A system comprising:
at least one physical computing device that
- accesses a first dataset captured by a set of capture devices while the capture devices are positioned in a first positional configuration of a plurality of different positional configurations, wherein:
  - the plurality of different positional configurations each implement a formation including a center position and a plurality of peripheral positions around the center position,
  - a particular capture device in the set of capture devices is positioned at the center position of the formation for the first positional configuration, and
  - the first dataset includes a first synchronized set of frames captured by the set of capture devices while set up in the first positional configuration;
- accesses a second dataset captured by the set of capture devices while the capture devices are positioned in a second positional configuration of the plurality of different positional configurations, wherein:
  - the particular capture device is positioned at a particular peripheral position of the plurality of peripheral positions of the formation for the second positional configuration, and
  - the second dataset includes a second synchronized set of frames captured by the set of capture devices while set up in the second positional configuration;
- determines three dimensional ("3D") locations of features of a calibration object positioned in front of the formation, each 3D location determined based on different representations of the calibration object from different view angles associated with the center position and the particular peripheral position within the formation, the different representations depicted by frames included in the first synchronized set of frames and the second synchronized set of frames;
- determines a set of intrinsic parameter values for the particular capture device based on the determined 3D locations of the features of the calibration object; and
- generates, for experiencing by a virtual reality user, virtual reality content representative of a real-world scene that is captured in part by the particular capture device as calibrated with the determined set of intrinsic parameters.

11. The system of claim 10, wherein the determining of the 3D locations of the features of the calibration object based on the different representations depicted by frames included in the first synchronized set of frames includes:
- determining, for each particular feature of the calibration object and based on a representation of the calibration object captured by the particular capture device when set up at the center position of the formation for the first positional configuration, a two dimensional ("2D") location of the particular feature with respect to a 2D plane oriented to be orthogonal with a viewing ray of the capture device set up at the center position of the formation; and
- determining, for each particular feature of the calibration object and based on one or more representations of the calibration object captured by additional capture devices of the set of capture devices that are set up at the plurality of peripheral positions of the formation, a depth of the particular feature with respect to the particular capture device set up at the center position.

12. The system of claim 10, wherein the at least one physical computing device determines the 3D locations of the features of the calibration object in accordance with a dense sampling technique in which representations of the calibration object are captured repeatedly until the features of the calibration object have been densely captured across all parts of a lens of the particular capture device.

13. The system of claim 10, wherein the formation includes four positions comprising the center position and three peripheral positions, the three peripheral positions forming vertices of a triangle that encloses the center position as viewed from a position of the calibration object in front of the formation.

14. The system of claim 10, wherein the calibration object comprises a checkerboard pattern and the features of the calibration object comprise points on the checkerboard pattern where a plurality of squares of the checkerboard pattern meet.

15. The system of claim 10, wherein the at least one physical computing device determines the set of intrinsic parameter values for the particular capture device by:
- setting up an overdetermined system of equations representative of a set of intrinsic parameters for the particular capture device, the equations in the overdetermined system of equations based on the determined 3D locations of the features of the calibration object; and
- performing an optimization with respect to the overdetermined system of equations to calculate the set of intrinsic parameter values for the particular capture device.

16. The system of claim 10, wherein the at least one physical computing device further:

sets up an overdetermined system of equations representative of a set of intrinsic parameters and a set of extrinsic parameters for the particular capture device, the equations in the overdetermined system of equations based on 3D locations of the features of the calibration object determined using the set of capture devices while the set of capture devices is set up in a volumetric capture configuration; and determines a set of extrinsic parameter values for the particular capture device by fixing variables, within the overdetermined system of equations, that correspond to the set of intrinsic parameters to be equal to values corresponding to the determined set of intrinsic parameter values, and performing, while the variables that correspond to the set of intrinsic parameters are fixed to the values corresponding to the determined set of intrinsic parameter values, an optimization with respect to the overdetermined system of equations to calculate the extrinsic parameter values for the particular capture device.

17. The system of claim 10, wherein the at least one physical computing device further:

accesses a third dataset captured by the set of capture devices while the capture devices are positioned in a third positional configuration of an additional plurality of different positional configurations, wherein:

the additional plurality of different positional configurations each implement an additional formation that includes the center position and a plurality of additional peripheral positions around the center position at a distance from the center position different from a distance of the one or more peripheral positions in the formation, the third dataset includes a third synchronized set of frames captured by the set of capture devices while the set of capture devices is set up in the third positional configuration within the additional plurality of different positional configurations; and determines 3D locations of features of an additional calibration object positioned in front of the additional formation, each 3D location determined based on different representations of the additional calibration object from different view angles associated with the center position and the one or more additional peripheral positions within the additional formation;

wherein the determination of the set of intrinsic parameter values for the particular capture device is further based on the determined 3D locations of the features of the additional calibration object.

18. A non-transitory computer-readable medium storing instructions that, when executed, direct a processor of a computing device to:

access a first dataset captured by a set of capture devices while the capture devices are positioned in a first positional configuration of a plurality of different positional configurations, wherein:

the plurality of different positional configurations each implement a formation including a center position and a plurality of peripheral positions around the center position, a particular capture device in the set of capture devices is positioned at the center position of the formation for the first positional configuration, and the first dataset includes a first synchronized set of frames captured by the set of capture devices while set up in the first positional configuration;

access a second dataset captured by the set of capture devices while the capture devices are positioned in a second positional configuration of the plurality of different positional configurations, wherein:

the particular capture device is positioned at a particular peripheral position of the plurality of peripheral positions of the formation for the second positional configuration, and the second dataset includes a second synchronized set of frames captured by the set of capture devices while set up in the second positional configuration;

determine three dimensional ("3D") locations of features of a calibration object positioned in front of the formation, each 3D location determined based on different representations of the calibration object from different view angles associated with the center position and the particular peripheral position within the formation, the different representations depicted by frames included in the first synchronized set of frames and the second synchronized set of frames;

determine a set of intrinsic parameter values for the particular capture device based on the determined 3D locations of the features of the calibration object; and generate, for experiencing by a virtual reality user, virtual reality content representative of a real-world scene that is captured in part by the particular capture device as calibrated with the determined set of intrinsic parameters.

19. The non-transitory computer-readable medium of claim 18, wherein the determining of the 3D locations of the features of the calibration object based on the different representations depicted by frames included in the first synchronized set of frames includes:

determining, for each particular feature of the calibration object and based on a representation of the calibration object captured by the particular capture device when set up at the center position of the formation for the first positional configuration, a two dimensional ("2D") location of the particular feature with respect to a 2D plane oriented to be orthogonal with a viewing ray of the capture device set up at the center position of the formation; and determining, for each particular feature of the calibration object and based on one or more representations of the calibration object captured by additional capture devices of the set of capture devices that are set up at the plurality of peripheral positions of the formation, a depth of the particular feature with respect to the particular capture device set up at the center position.

20. The non-transitory computer-readable medium of claim 18, wherein the formation includes four positions comprising the center position and three peripheral positions, the three peripheral positions forming vertices of a triangle that encloses the center position as viewed from a position of the calibration object in front of the formation.

* * * * *